(12) United States Patent
McDowell et al.

(10) Patent No.: US 10,237,254 B2
(45) Date of Patent: Mar. 19, 2019

(54) CONDITIONAL LOGIN PROMOTION

(71) Applicant: McAfee, LLC, Santa Clara, CA (US)

(72) Inventors: John R. McDowell, Palo Alto, CA (US); Neeraj Kaul, Cupertino, CA (US); Pavan Kumar V. Bharathapudi, San Jose, CA (US); Siddaraya B. Revashetti, Cupertino, CA (US); Ranjit S. Narjala, Portland, OR (US); Ramkumar Ram Chary Venkatachary, Portland, OR (US); Sahar Mostafa, Hillsboro, OR (US); Vani Yalapalli, Hillsboro, OR (US); Charles Slate, Milton, MA (US)

(73) Assignee: McAfee, LLC, Santa Clara, CA (US)

( * ) Notice: Subject to any disclaimer, the term of this patent is extended or adjusted under 35 U.S.C. 154(b) by 28 days.

(21) Appl. No.: 14/780,528

(22) PCT Filed: Mar. 27, 2015

(86) PCT No.: PCT/US2015/022931
§ 371 (c)(1),
(2) Date: Sep. 26, 2015

(87) PCT Pub. No.: WO2016/076913
PCT Pub. Date: May 19, 2016

(65) Prior Publication Data
US 2016/0330183 A1 Nov. 10, 2016

Related U.S. Application Data

(60) Provisional application No. 62/079,243, filed on Nov. 13, 2014, provisional application No. 62/079,055, (Continued)

(51) Int. Cl.
G06F 7/04 (2006.01)
H04L 29/06 (2006.01)
H04L 9/32 (2006.01)

(52) U.S. Cl.
CPC .............. H04L 63/08 (2013.01); H04L 9/321 (2013.01); H04L 9/3231 (2013.01);
(Continued)

(58) Field of Classification Search
None
See application file for complete search history.

(56) References Cited

U.S. PATENT DOCUMENTS 5,987,610 A 11/1999 Franczek et al.
6,073,142 A 6/2000 Geiger et al.
(Continued)

FOREIGN PATENT DOCUMENTS

WO WO2016/076913 A1 5/2016

OTHER PUBLICATIONS

International Search Report and Written Opinion in International Application No. PCT/US2015/022931, dated Jul. 30, 2015, 12 pages.

(Continued)

*Primary Examiner* — Brandon S Hoffman
(74) *Attorney, Agent, or Firm* — Patent Capital Group

(57) ABSTRACT

The present disclosure relates to a system and method for providing conditional login promotion. An example system includes at least one processor and at least one memory element, wherein the system is configured for receiving an indication of a local operating system login by a user from a client device associated with the user; receiving one or more authentication factors associated with the user from the client device; and determining whether the local operating system login is to be promoted to a relying party entity based upon the one or more authentication factors associated with the user.

30 Claims, 20 Drawing Sheets

Related U.S. Application Data filed on Nov. 13, 2014, provisional application No. 62/079,658, filed on Nov. 14, 2014.

(52) U.S. Cl.
CPC ...... *H04L 63/0815* (2013.01); *H04L 63/0884* (2013.01); *H04L 63/102* (2013.01); *H04L 63/105* (2013.01); *H04L 2463/082* (2013.01)

(56) References Cited

U.S. PATENT DOCUMENTS

| | | |
|---|---|---|
| 6,460,050 B1 | 10/2002 | Pace et al. |
| 7,506,155 B1 | 3/2009 | Stewart et al. |
| 9,300,671 B1* | 3/2016 | Barak ................. H04L 63/10 |
| 2011/0289572 A1 | 11/2011 | Skeel et al. |
| 2013/0086670 A1 | 4/2013 | Vangpat et al. |
| 2013/0125226 A1* | 5/2013 | Shah .................. H04L 63/0815 726/7 |
| 2014/0002238 A1 | 1/2014 | Taveau et al. |
| 2014/0189123 A1* | 7/2014 | Dodd ................. H04L 47/70 709/226 |
| 2014/0201809 A1 | 7/2014 | Choyi et al. |
| 2014/0208408 A1 | 7/2014 | Bilgen et al. |
| 2015/0046990 A1* | 2/2015 | Oberheide ............. G06F 21/32 726/6 |

OTHER PUBLICATIONS

International Preliminary Report on Patentability in International Application No. PCT/US2015/022931, dated May 16, 2017, 10 pages.

\* cited by examiner

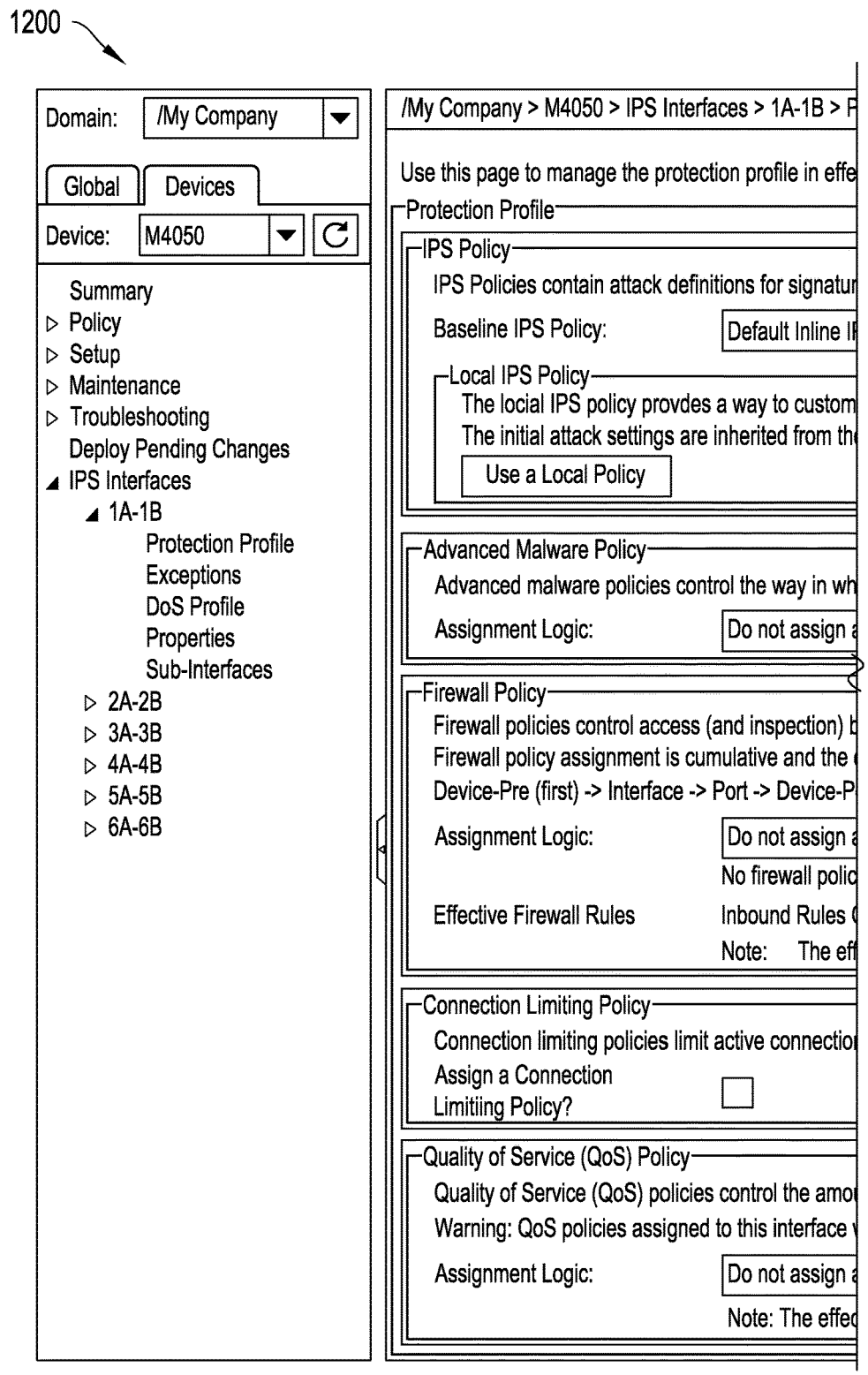
FIG. 12 (part 1)

rotection Profile ct for this resource.

e-based exploits, policy violations, and Denial-of-Service attacks.

PS ▼ | New ize attack settings for this particular interface.
e assigned baseline policy, yet customizations to the local policy affect this interface only.

ich files are scanned for malware and the actions taken when they are infected.

n advanced malware policy ▼ ased on source/destination, application, etc.
order of execution is as follows:
ost (last)
a firewall policy ▼
y will be assigned at this level
Outbound Rules
ective rules are based on the saved configuration (not necessarily the selected).

ns and connection rate based on protocol, reputation or country of origin.

int of bandwidth used by traffic type.
will be enforced on its sub-interfaces as well.
a QoS policy ▼
tive rules are based on the saved configuration (not necessarily the selected).

FIG. 12 (part 2)

Policy Manager

Interfaces | Devices

Tip: For advanced filtering, hover over a column heading and click the arrow.

Quick Search | Clear All Filters

| Device Name | Interface Name | Policy Group | Individual Policy Assignments ||||| |
|---|---|---|---|---|---|---|---|
| | | | IPS | Advanced Malware | Inspection Options | Connections Limiting | Firewall | QoS |
| Device name: vIPS6 ||||||||| 
| 1 vIPS6 | 1 | ... | Default Inline IPS | ... | Default Client Inspe... | ... | ... | ... |
| 2 vIPS6 | 2 | ... | Default Inline IPS | In: Default Malware Out:... | ... | ... | ... | ... |
| 3 vIPS6 | 3-4 | ... | Default Inline IPS | ... | ... | New CL Policy | ... | ... |

Save as CSV

3 Interfaces

FIG. 13

Use this page to perform core policy management tasks, such as adding, editing and assigning policies

Policy Manager 1400

[ Interfaces ] [ Devices ]

Tip: For advanced filtering, hover over a column heading and click the arrow.

1402

Quick Search    [Clear All Filters]  1404

| Device | Interface | Policy Group | Individual Policy Assignments | | | | | |
|---|---|---|---|---|---|---|---|---|
| | Name | | IPS | *Advanced Malware* | Inspection Options | Connections Limiting | Firewall | QoS |

Device name: vIPS6

| 2 | vIPS6 | 2 | ... | Default Inline IPS | in: Default Malware<br>Out: ... | ... | ... | ... | ... |

Current Filters
Interface Name = 1,2
Advanced Malware = malware

3 Interfaces

[Save as CSV]

FIG. 14

Use this page to perform core policy management tasks, such as adding, editing and assigning policies Policy Manager

[Interfaces] [Devices]

Tip: For advanced filtering, hover over a column heading and click the arrow.

| | Device Name | Interface Name | Policy Group | Individual Policy Assignments | | |
|---|---|---|---|---|---|---|
| | | | | IPS | Advanced Malware | Inspection |
| Device name: vIPS6 | | | | | | |
| 1 | vIPS6 | 1 | ... | Default Inline IPS | ... | Default Cl |
| 2 | vIPS6 | 2 | ... | Default Inline IPS | In: Default Malware Out: ... | ... |
| 3 | vIPS6 | 3-4 | ... | Default Inline IPS | ... | ... |

Save as CSV

FIG. 15 (part 1)

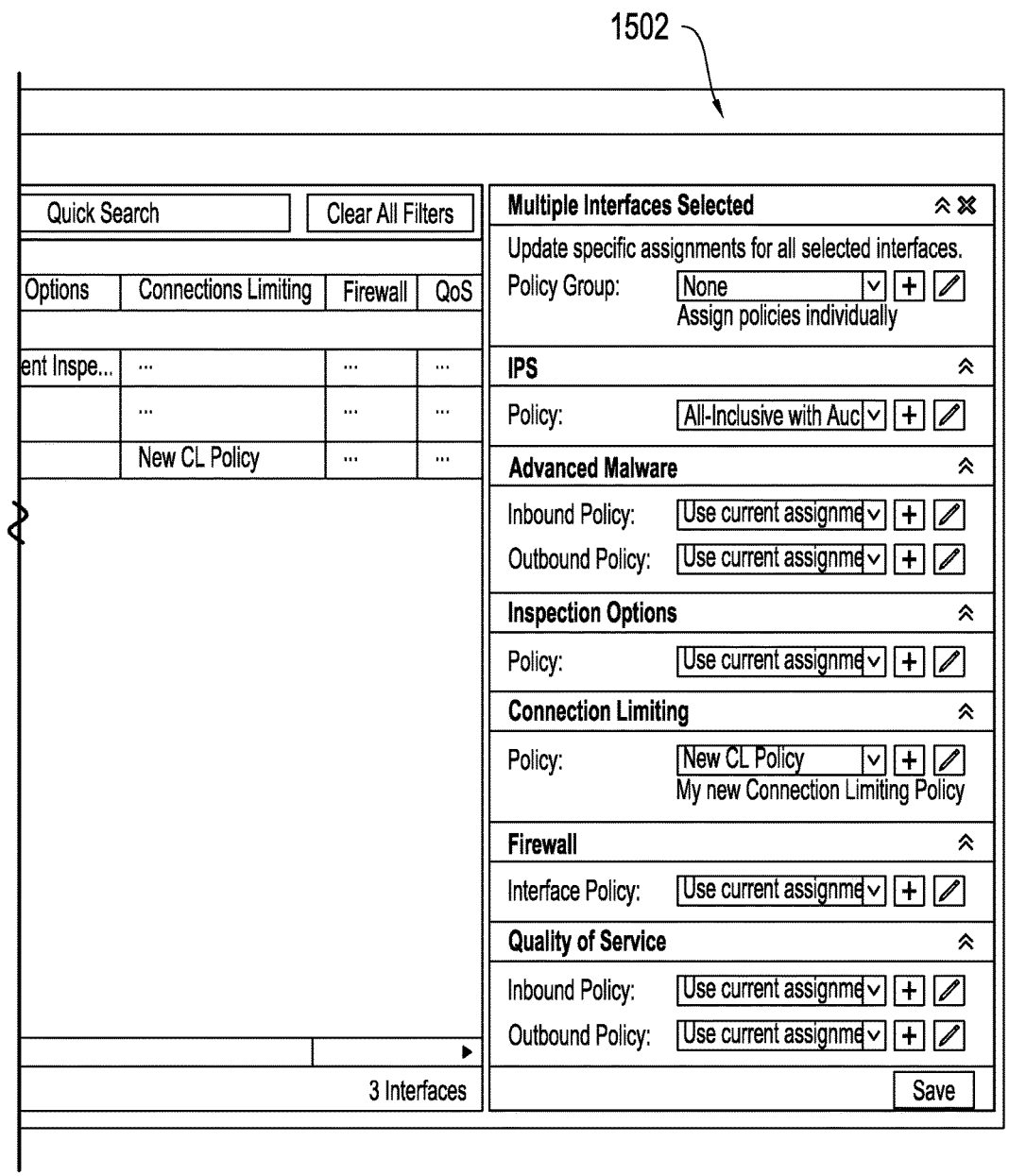
FIG. 15 (part 2)

1600

Use this page to perform core policy management tasks, such as adding, editing and assigning policies Policy Manager

[ Interfaces ][ Devices ]

Tip: For advanced filtering, hover over a column heading and click the arrow.

| | Device Name | Interface Name | Policy Group | Individual Policy Assignments | | Inspection |
|---|---|---|---|---|---|---|
| | | | | IPS | Advanced Malware | |
| Device name: vIPS6 | | | | | | |
| 1 | vIPS6 | 1 | ... | Default Inline IPS | ... | Default Cli |
| 2 | vIPS6 | 2 | ... | Default Inline IPS | In: Default Malware Out: ... | ... |
| 3 | vIPS6 | 3-4 | ... | Default Inline IPS | ... | ... |

↖ 1602

◀

[ Save as CSV ]

FIG. 16 (part 1)

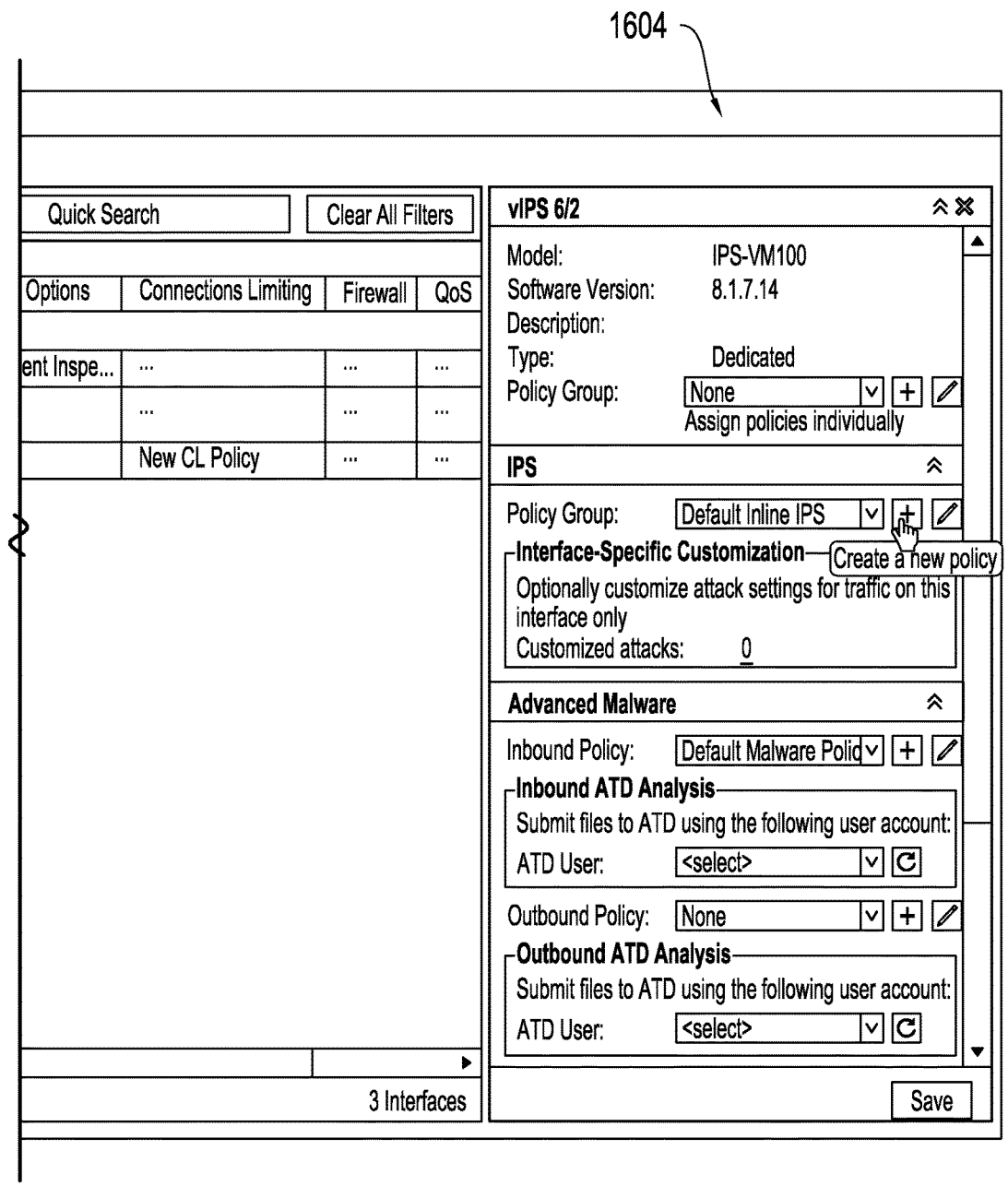
FIG. 16 (part 2)

CONDITIONAL LOGIN PROMOTION

This Application is a National Stage application under 35 U.S.C. 371 of International Application PCT/US15/22531 filed on Mar. 27, 2015, which claims the benefit of priority under 35 U.S.C. § 119(e) to U.S. Provisional Application Ser. No. 62/079,055, filed Nov. 13, 2014; U.S. Provisional Application Ser. No. 62/079,243, filed Nov. 13, 2014; and U.S. Provisional Application Ser. No. 62/079,658, filed Nov. 14, 2014. The disclosures of the prior applications are considered part of (and are incorporated by reference in) the disclosure of this application.

TECHNICAL FIELD

Embodiments described herein generally relate to the field of computing, and more particularly to conditional login promotion.

BACKGROUND

Network-based services such as streaming video services are becoming increasingly popular. Providers of these network-based services often require users to be identified and authenticated by the user before allowing access to their services. Typically, the user must provide one or more authentication credentials, such as a user name and password, to a particular provider before access is granted. Often, a user must maintain separate authentication credentials for each services requiring cumbersome redundant independent logins to be provided to each service by a user.

BRIEF DESCRIPTION OF THE DRAWINGS

Embodiments are illustrated by way of example and not limitation in the figures of the accompanying drawings, in which like references indicate similar elements and in which:

FIG. 12 illustrates a protection profile interface management page within a traditional network security platform GUI;

FIG. 13 illustrates a policy management GUI page for a network security platform in accordance with one embodiment;

FIG. 14 illustrates a policy management GUI page for a network security platform for performing filtering operations according to one embodiment;

FIG. 15 illustrates a policy management GUI page for a network security platform for performing bulk editing operations according to one embodiment; and FIG. 16 illustrates a policy management GUI page for a network security platform for performing viewing, editing, and creating of policy definitions according to one embodiment.

DESCRIPTION OF EMBODIMENTS

One or more example embodiments are directed to conditional promotion of a local operating system (OS) login by a user associated with a client device to one or more relying party (RP) entities providing resources within a network, such as a cloud network, by one or more servers associated with the RP entity. In accordance with one or more embodiments, the resources provided by the one or more servers associated with an RP entity may include a service and/or application. In some embodiments, a cloud-based Policy Engine is used to promote local OS windows login the relying party entities in the cloud to authenticate a user with the relying party entity, thus eliminating the need for redundant logins at both the local OS level and the RP entity. In one or more embodiments, RP entities are entities such as web sites, vendors and other providers of data and services that require their users to be identified and authenticated before accessing their resources. Examples of RP entities include network-based services such as Netflix, Facebook, LinkedIn, Fedex, DropBox, etc.

In accordance with various embodiments, an authentication framework is provided for taking advantage of a local OS login as well as additional authentication factors obtained from the user to provide access to a user's cloud services using multiple authentication factors, including biometrics, while eliminating the need for repetitive logins to individual services. One or more embodiments described herein are directed to promotion of local OS login to a relying party entity providing cloud services to the user to allow the local OS login to authenticate the user with the relying party entity.

Figure 1:
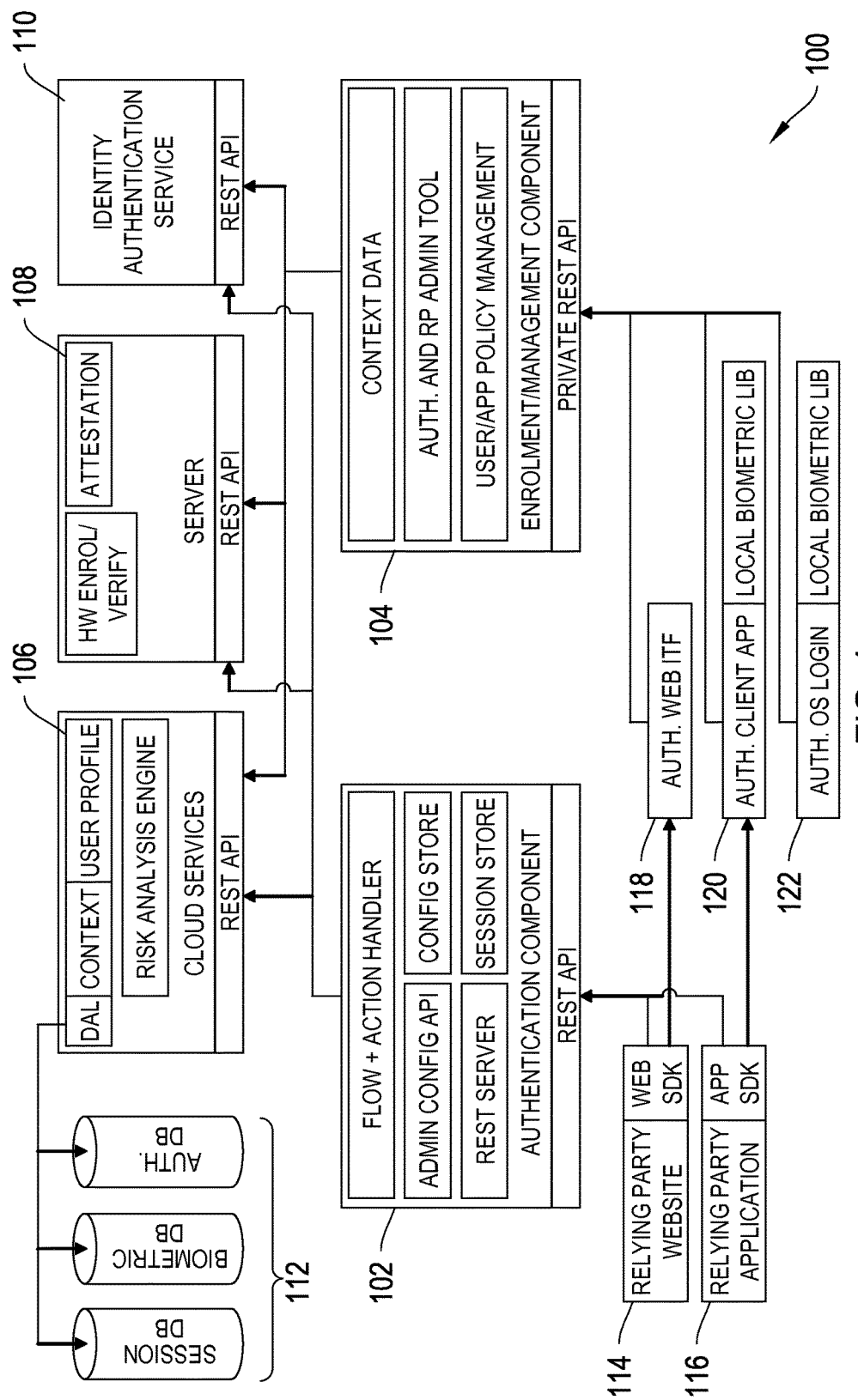
FIG. 1 illustrates a high level architecture for conditional login promotion including client side and server side components according to one embodiment.

FIG. 1 illustrates a high level architecture 100 for conditional login promotion including client side and server side components according to one embodiment. In the particular embodiment illustrated in FIG. 1, architecture 100 includes an authentication component 102 and an enrolment/management component 104. Authentication component 102 includes one or more authentication modules configured to handle authentication requests from client devices as will be further described herein. In the illustrated embodiments, the authentication modules of authentication component 102 include a flow and action handler module, an administration configuration application programming interface (API), a configuration store, a Representational State Transfer (REST) server, a session store, and a REST API. In a particular embodiment, the authentication modules are configured according to the OAuth open standard. Enrolment/management component 104 includes a context data module, a relying party administration tool, a user/application policy management module and a private REST API.

Authentication component 102 and enrolment/management component 104 are each in further communication with cloud services 106, a server 108, and identity authentication service 110. Clouds services 106 further include a data abstraction layer (DAL), a context module, a user profile module, a risk analysis engine, and a REST API. Server 108 includes a hardware enrolment/verify module, attestation module, and a REST API. Identity authentication service 110 includes a REST API configured to facilitate communication with other components within architecture 100. Cloud services 106 are in further communication with one or more databases 112. In the particular illustrated embodiment, databases 112 includes a session database, a biometric database, and an authentication database.

Architecture 100 further includes a relying party website 114 and a relying party application 116 residing in one or more servers associated with one or more relying party entities. Each of relying party website 114 and relying party application 116 are in communication with authentication component 102. Relaying party website includes a web software development kit (SDK) and is in further communication with a authentication web interface 118. Authentication web interface 118 is in further communication with enrolment/management component 104. Replying party application 116 is in further communication with an authentication client application 120. Authentication client application 120 is in further communication with enrolment/management component 104. Architecture 100 further includes an authentication OS login component 122 in communication with enrolment/management component 104. Each of authentication client application 120 and authentication OS login component 122 includes a local biometric library to facilitate obtaining biometric data from a user.

Authentication component 102 is configured to handle authentication requests for the authentication functionality and create an authentication specific flow and action handler that interacts with components such as user profile, policy, and biometric components to handle authentication requests. During an enrolment procedure, enrolment/management component 104 is interfaces with various components via the private REST API and create a user profile for a particular user and associates the user profile with a relying party (RP) client identifier (ID) identifying a particular RP client. In one or more embodiments, the user profile and RP client policies are created and stored in one or more databases (DBs) 112. In particular embodiments, the DB structure for the user profile, RP application policies and context data is shared with authentication module 102 for authentication requests.

In one example embodiment, a policy engine within one or more authentication servers manages policy for login promotion to one or more RP entities. In a particular embodiment, a policy associated with the user is configurable by both a subscribing RP entity and a user's own security settings to control access by the user to resources provided by the RP entity. In particular embodiments, a minimum security level for use of authentication factors is set and the user and/or the RP entity may increase the level and number of factors for authentication but not reduce it. The policy engine may be configured to determine whether promotion of the local OS login can be applied to a cloud-based application based on the authentication factors used by the user to authenticate to the local login. The authentication factors considered may include both active authentication factors (requiring the user to take an action, such as presenting their face and/or blinking) and passive authentication factors (transparent to the user, such as an identity of the client device the user is connecting from being trusted). The resulting promotion provides ease of authentication to the user while enforcing the required security settings and additional authentication factors mandated by either the RP entity, the user, or both.

One or more embodiments may provide a better authentication solution than existing solutions in that it allows concentration of all login and authentication requirements in one place, and eliminates the need for maintaining separate authentication credentials for various applications and redundant, independent logins to these multiple services. One or more embodiments concentrate and maintain the authentication process and authentication factors in a local secure setting, avoiding transmission and duplication of these authentication factors in the cloud for additional security of the authentication data. One or more embodiments described herein provide for the usage of multiple active and passive authentication factors, in addition to decision making as to whether the authentication factors provided by the user have met the required level of security to promote the trust to other applications.

In accordance with one or more embodiments, the authentication architecture simplifies the user authentication and identification mechanism and consolidates authentication requirements for multiple services in one tool. In particular embodiments, the authentication architecture serves two types of cloud-based services: 1) a Relying Party—a service that subscribes to and utilizes authentication functionality for its authentication needs and 2) services that are not yet authentication enabled. In particular embodiments, the authentication architecture enables users to login locally to a Windows OS and, if the local login is successful and if the user has configured a cloud account for authentication, create a new session and check to determine if cloud promotion is possible. Examples of conditions that may indicate that cloud promotion is possible include if there is an internet connection, no other active sessions exists, and other boundary checks. If successful, the authentication architecture may presents a cloud dashboard graphical user interface (GUI) (such as a password box GUI) to allow connection to the user's RP entities and, provided the user meets the requirements, will promote the OS login session information to the RPs in the cloud. In particular embodiments, the authentication architecture creates a cloud session for the user, ensures that the data in the two sessions match and, if successful, logs the user to other authentication-enabled services.

In more specific embodiments, the authentication architecture logs the user to their local machine with password and/or any other authentication factors such as a variety of biometrics and other active authentication factors, in conjunction with additional passive authentication factors, such as the use of a trusted device, a trusted network, or a trusted geolocation among others. In one or more embodiments, the authentication architecture does not directly log the user into the cloud using their cloud login; instead it promotes the effect of their local login to enable their access to the cloud-based applications transparently. Various embodiments of the one or more schemes described herein take advantage of user local validation using active authentication factors, enhance it utilizing passive authentication factors such as a calculated device ID based on a trusted device, network, and location, proximity, and safe zones (trusted Wi-Fi locations) among others and then promoting the trust to the cloud. In one example of the result of the use of active/passive authentication factors, if the user is logging into a local OS from a trusted device with biometrics, but the policy engine determines that the user is not logging in from a safe zone (for example an unknown Wife network) then cloud login promotion will not occur.

In one or more embodiments, a resulting cloud profile tracks the user's recent application usage and automatically logs the user into his or her applications. In particular embodiments, the user can configure his or her dashboard to automatically log the user into the applications upon user login to Windows. In particular embodiments, the authentication architecture can utilize face recognition as an authentication factor instead of, or in addition to, a master password. In one or more particular embodiments, the policy engine transparently takes care of login using JavaScript. In particular embodiments, users can configure different levels of security settings for themselves and RPs associated with the authentication enabled applications can increase these settings. In addition to configurability of multiple factors to be used for authentication, in one or more embodiments the user has the option of adding his or her devices to a trusted list to be used as an out-of-band (OOB) authentication factor. For example, the device from which the user first enrolls into the authentication architecture may be considered a trusted device as well as a mobile device the user may add to the list. Additional functionality may enable a trusted network and a trusted location to be added and utilized as additional authentication/identifying factors.

In particular embodiments, a unique trusted device ID is calculated and associated with the user when the user performs a local login as part of the passive authentication factors. This combination of the device ID and configurable authentication factors enable the policy engine make a decision as to whether or not promotion of the local login to the RPs in the cloud should be allowed.

In accordance with various embodiments, an access level is defined by a policy engine in the cloud. In one or more embodiments, several levels of authentication strength may be allowed as determined by policy. Some applications may require additional factors based upon the requirements of the application. In particular embodiments, the relying party may set the particular requirements for an application, and may be located within a core network of a service provider. Although not illustrated in FIG. 2, it should be understood that in particular embodiments, authentication server may include or in communication with one or more of cloud services 106, server 108, identity authentication service 110, and database(s) 112.

Each of first client device 202a and second client device 202b includes a first user interface (UI) 212a and second user interface (UI) 212b, respectively, configured to facilitate login and authentication of an associated user with one or more of relying party (RP) servers 210a-210c as will be further described herein. Client devices 202a-202b may include any electronic or computing device capable of accessing services or applications provided by one or more of relying party servers 210a-210c. These client devices can include, for example mobile phones, desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these. The computing device may use operating systems that include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Relying party (RP) servers 210a-210c are servers associated with entities such as web sites, vendors and other providers of data, services, and applications that require their users to be identified and authenticated before accessing their resources.

In an example implementation, first client device 202a, second client device 202b, authentication server 206 first RP server 210a, second RP server 201b, and third RP server
the level can also be raised by the user settings. In one or more embodiments, the relying party chooses the level of security required for a particular application associated with the relying party such as what authentication factors (e.g., facial recognition, trusted device, trusted network, and others)—are required for access to the RPs site and/or applications. This information may be stored in a profile for the relying party. In particular embodiments, the user can add additional factors such as an out-of-band factor (for example, one of their trusted devices). In particular embodiments, the user can strengthen the security, but cannot decrease it below the relying party requirements. The security level determines what authentication factors the user needs to present for authentication to obtain access to the relying party's website and/or applications. In one or more embodiments, a profile is associated with the user for use in authentication. In particular examples, the user profile is generated according to a predefined template. In addition, there may be additional requirements for security access for one or more portions of the relying party's site. In one or more embodiments, a relationship is established between the user profile and the relying party. Before setting the relationship between user profile and the relying party, the policy engine determines how the user settings interact with relying party requirements to determine the nature of the relationship. This mechanism allows both the user and the provider of the data to share in specifying the level of authentication required.

Figure 2:
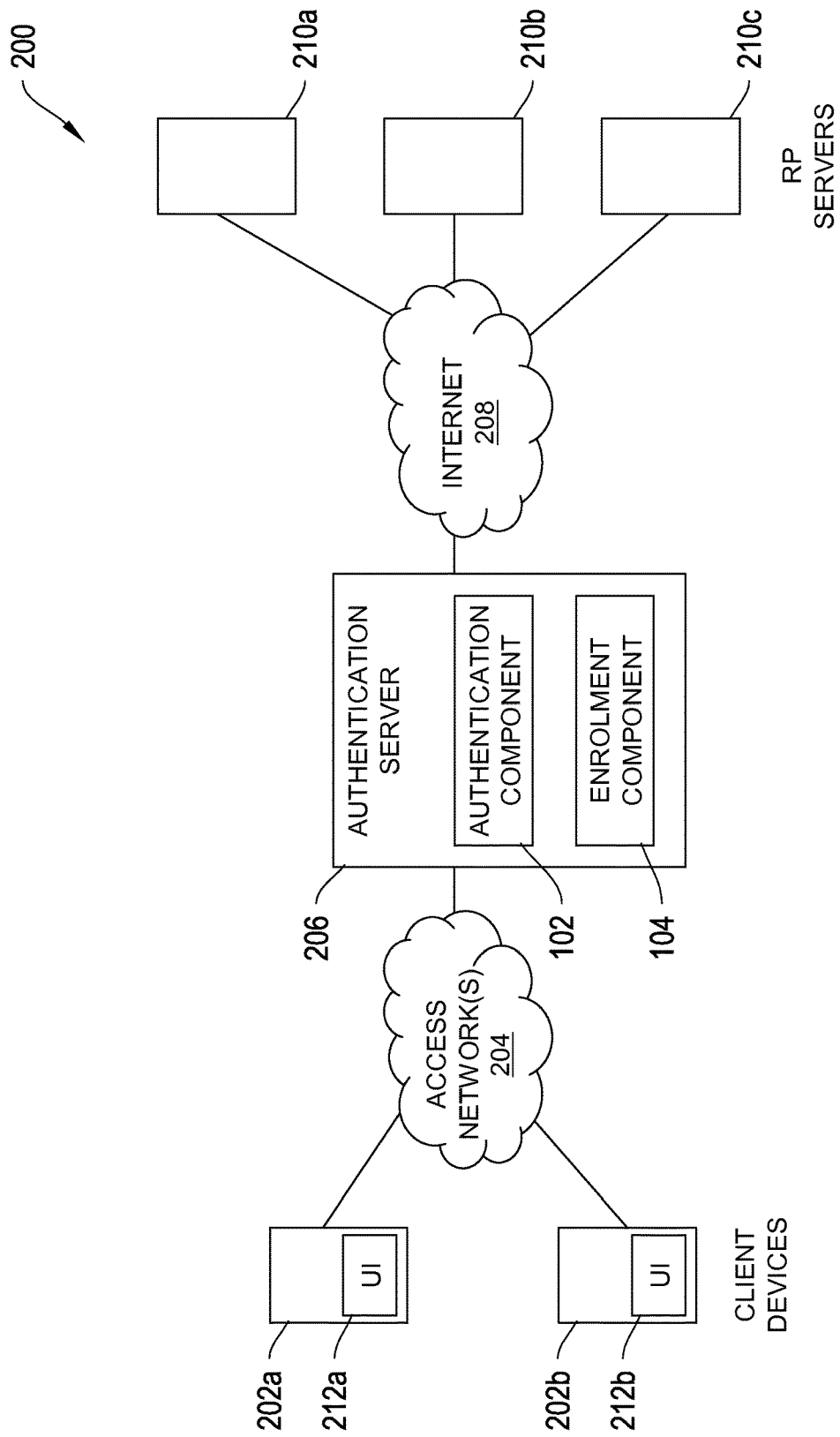
FIG. 2 illustrates a communication system for conditional login promotion in accordance with one embodiment.

FIG. 2 illustrates a communication system 200 for conditional login promotion in accordance with one embodiment. The communication system 200 include a first client device 202a and a second client device 202b in communication with an authentication server 206 via one or more access network(s) 204. Authentication server 206 is in further communication with a first relying party server 210a, a second relying party server 210b, and a third relying party server 210c via the Internet 208. Each of first client device 202a and second device 202b includes a user interface to allow a user of the device to provide local login and authentication information to authentication server 206 in order to determine whether the local login is to be promoted to one or more of the relying party servers 210a-210c. Access network(s) 204 may include one or more of a mobile access network, the Internet, or any other suitable access network to allow client devices 202a-202b to communicate with authentication server 206. The authentication server 206 includes the authentication component 102 and enrolment component 104 previously described with respect to FIG. 1. In particular embodiments, authentication server 206

210c are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 200, each of first client device 202a, second client device 202b, authentication server 206 first RP server 210a, second RP server 201b, and third RP server 210c can include memory elements for storing information to be used in the operations outlined herein. Each of first client device 202a, second client device 202b, authentication server 206 first RP server 210a, second RP server 201b, and third RP server 210c may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 200 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, computer code, or processor instructions that are executed to carry out the activities described herein.

In an example implementation, network elements of communication system 200, such as first client device 202a, second client device 202b, authentication server 206 first RP server 210a, second RP server 201b, and third RP server 210c, may include software modules to achieve, or to foster, operations as outlined herein. These modules may be suitably combined in any appropriate manner, which may be based on particular configuration and/or provisioning needs. In certain embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of first client device 202a, second client device 202b, authentication server 206 first RP server 210a, second RP server 201b, and third RP server 210c may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, computer code, electronic instructions, or any suitable combination thereof. Any of the potential processing elements, modules, and machines described herein should be construed as being encompassed within the broad term 'processor.'

Figure 3A:
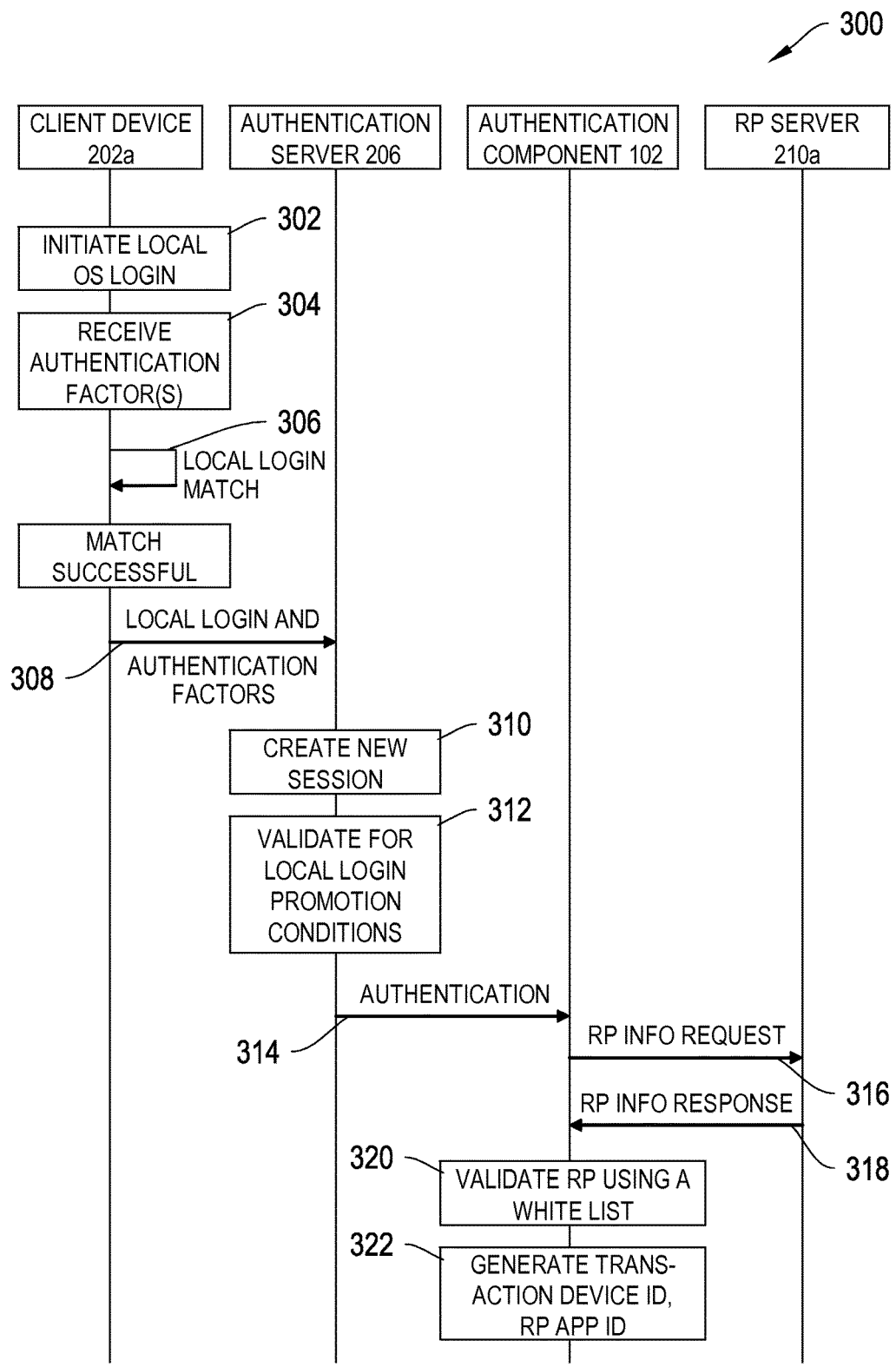
FIGS. 3A-3B illustrate an example of a process flow for local operating system (OS) login promotion in accordance with one embodiment.
Figure 3B:
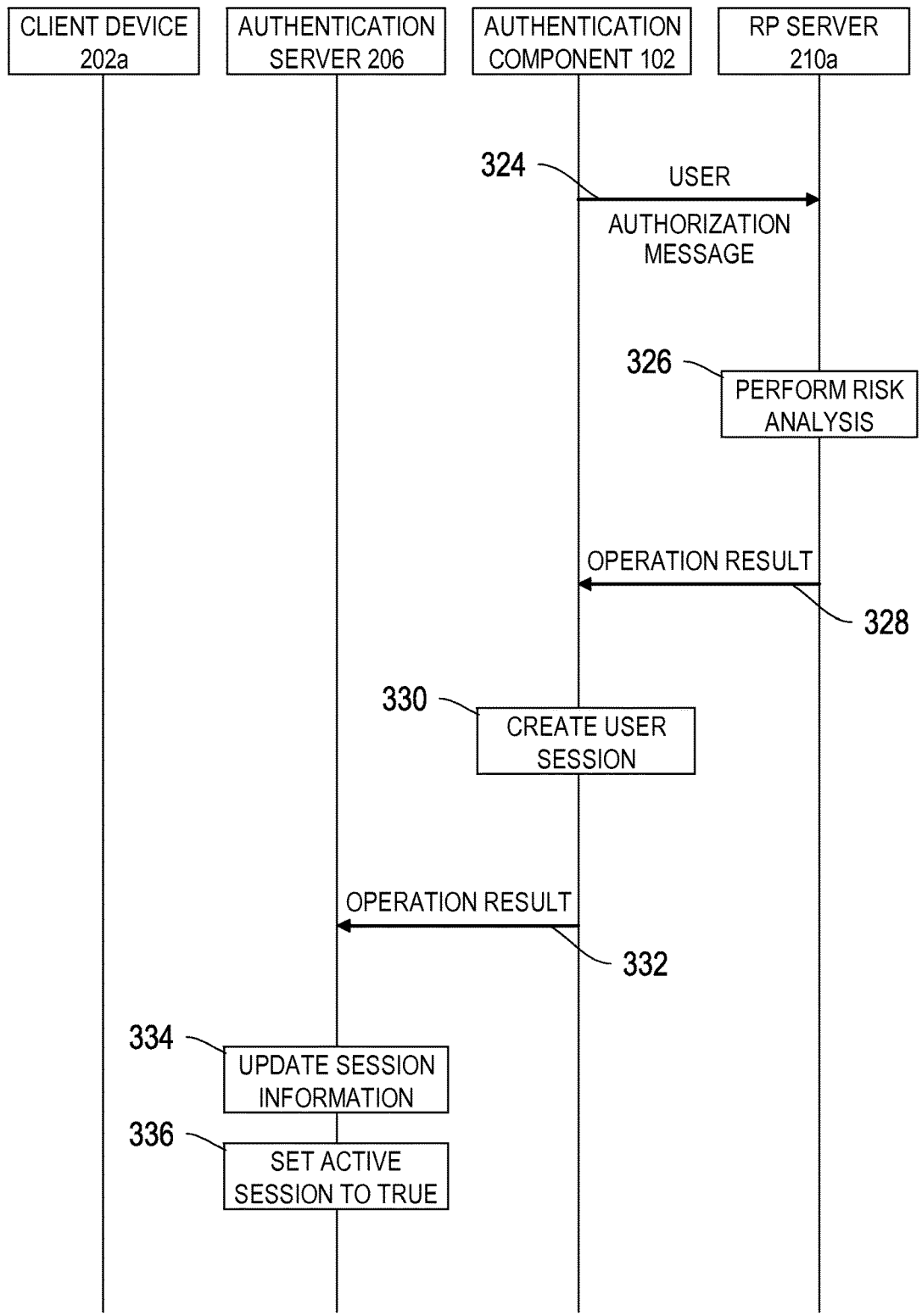

FIGS. 3A-3B illustrate an example of a process flow 300 for local OS login promotion in accordance with one embodiment. In 302, a user of client device 202a initiates a local operating system (OS) login procedure to receive local login information associated with a local OS of client device 202a from the user via a user interface (UI), such as a graphical user interface (GUI) of client device 202a. In particular embodiments, the local login information may include one or more of a user identifier, a password, a personal identification number (PIN), or any other suitable information required to login to the local OS of client device 202a. In 304, client device 202a receives one or more authentication factors from the user. In one or more embodiments, the authentication factors may include one or more biometric authentication factors obtained from the user such as a fingerprint or facial recognition. In particular embodiments, the authentication factors received from the user may include active authentication factors and/or passive authentication factors. In particular embodiments, active authentication factors may include requiring the user to take an action such as presenting the user's face and/or blinking of the user's eyes to a camera associated with client device 202a. In still other particular embodiments, passive authentication factors may include authentication factors that are transparent to the user such as an identity of client device 202a indicative of client device 202a being trusted by authentication server 206.

In 306, client device 202a performs a local login match procedure to determine whether the local login information provided by the user matches stored local login information associated with the user. In particular embodiments, the stored local login information may be stored within client device 202a. In still other particular embodiments, the stored local login information may be stored within a server associated with client device 202a. If the match is successful, in 308, client device 202a sends an indication of the successful local operating system login and the one or more authentication factors to authentication server 206. In 310, authentication server 206 creates a new session for client device 202a in response to receiving the local login and authentication information.

In 312, authentication server 206 validates whether the local OS login satisfies one or more OS promotion conditions for promoting the local OS login to a RP service and/or application associated with RP server 210. In one or more embodiments, the OS promotion conditions may include one or more of determining whether a session flag is indicative of no active sessions with client device 202a, determining whether there is a network connection, determining whether a current number of users in a remote user table is less than a predetermined threshold [OS LOGIN NUMBER OF USERS TO PROMOTE], determining whether information in a remote user table and a local user table are the same, determining whether the last promotion for the user was beyond a predetermined time period, and determining whether the one or more authentication factors, such as a liveliness indication, meet a required level of security to authenticate the user. In a particular embodiment, the local OS login is promoted to RP server 210*a* if an active session flag is set to false, a network connection to the Internet exists, the current number of users in the remote user table is less than the predetermined threshold, the user data in the remote user table and the local user table are the same, the last promotion for this user was at least 24 hours ago, and a liveliness check of the user, such as an indication of the user blinking, is successful.

If promotion is to be performed, the authentication server 206 component sends an authentication message to authentication component 102 indicative that the local OS login of the user via client device 202*a* is to be promoted to RP server 210*a*. In one or more embodiments, the authentication message includes an identifier associated with the relying party, an identifier associated with the user, and an indication that an active session is established for client device 202*a*. In a particular embodiment, the authentication message is of the form Authenticate(RPid,email,Processed Frame, Active=true) in which RPid is the RP identifier, email is an email address identifying the user, Processed Frame is a current processed frame, and Active=true is an indicator that the active session is established.

In 316, authentication component 102 requests relying party information from RP server 210*a* associated with a requested RP service and/or RP application from RP server 210*a* if authentication component 102 does not already have the requested relying party information stored within a cache associated with authentication component 102. In particular embodiments, the relying party information may include an identity associated with the relying party, relying party server 210*a*, a relying party service, and/or a relying party application. In 318, authentication component 102 receives the requested relying party information from RP server 210*a*. In 320, authentication component 102 validates the RP information using a white list to determine whether the relying party service and/or application is valid. If the RP is valid, in 322, authentication component 102 generates a transaction device ID identifying client device 102*a* and RP Application ID identifying the particular RP service and/or application provided by RP server 210*a*.

In 324, authentication component 102 sends an authorization message to RP server 210*a* authorizing the user associated with client device 102*a* to access the service and/or application provided by RP server 210*a*. In a particular embodiment, the authorization message is of the form authorize user (Userdata(OAuthTransid, email, Frames), RpData) in which a Userdata field includes an OAuth transaction ID, an email address of the user, and frames to be process, and an RpData field including data to be sent to RP server 210. In 326, RP server 210*a* performs risk analysis to determine whether the user is to be granted access to the requested RP service and/or application. In 328, RP server 210*a* sends a first operational result message indicative of the risk analysis results to authorization component 102. The first operational result message is indicative of whether the risk analysis indicates that the user will be granted access to the RP service and/or application provided by RP server 210*a*. If the first operational result indicates that access is to be granted, in 330 authorization component 102 creates a user session. In 332, authentication component 102 sends a second operation result message to the authentication server 206 indicative of whether the creation of the user session was successful. If successful, authorization server 206 updates the session information in 334, and sets an active session to true in 336. Upon completion of the above procedures, an active session is established between client device 202*a* and RP server 210*a* to allow client device 202*a* to access one or more services and/or application provided by RP server 210*a*.

Figure 4:
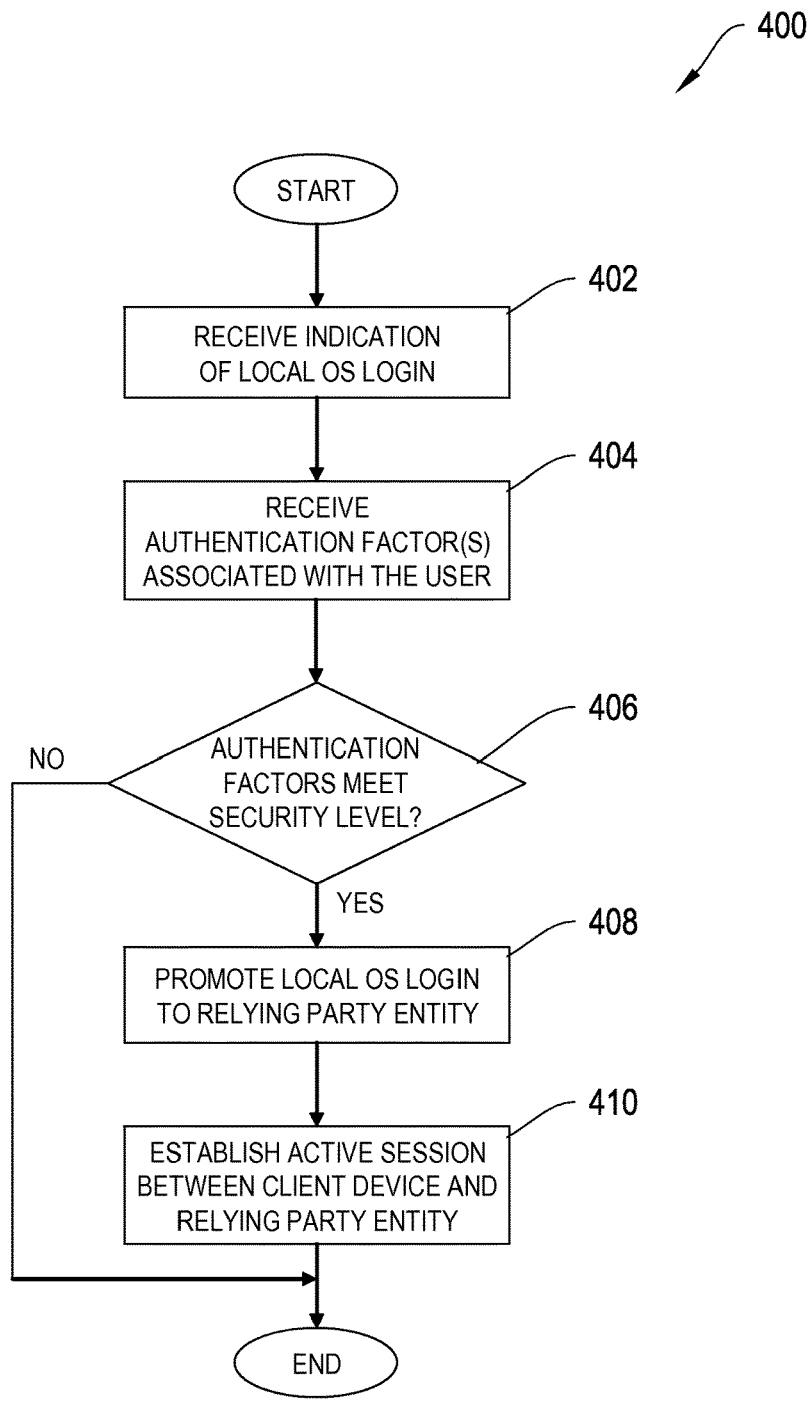
FIG. 4 is simplified flow diagram illustrating example operations associated with for local OS login promotion in accordance with one embodiment.

FIG. 4 is simplified flow diagram 400 illustrating example operations associated with local OS login promotion in accordance with one embodiment. In 402, authentication server 206 receives an indication of a local operating system login by a user from a client device 202*a* associated with the user. In 404, authentication server 206 receives one or more authentication factors associated with the user from client device 202*a*. In 406, authentication server 206 determines whether the local operating system login is to be promoted to a relying party entity, such as RP server 210*a*, based upon the one or more authentication factors associated with the user. In one more embodiments, determining whether the local operating system login is to be promoted to the relying party entity includes determining whether the one or more authentication factors meet a required level of security. In one or more embodiments, the one or more authentication factors include one or more of at least one active authentication factor and at least one passive authentication factor. In particular embodiments, the at least one active authentication factor include a biometric authentication factor. In still other particular embodiments, the biometric authentication factor includes facial recognition of the user. In still other particular embodiments, the at least one active authentication factor includes a liveliness indication of the user. In other particular embodiments, the at least one passive authentication factor includes a device identifier associated with the client device.

If it is determined that that the authentication factors do not meet the predetermined level of security, the operations end. If it is determined that that the authentication factors do meet the predetermined level of security, in 408 authentication server 206 promotes the local operating system login to the relying party entity responsive to determining that the authentication factors meet the required level of security. In particular embodiments, promoting the local operating system login to the relying party entity includes authorizing client device 202*a* to access one or more resources associated with the relying party entity. In a particular embodiment, the one or more resources include at least one of a service provided by the relying party entity or an application provided by the relying party entity. In 410, authentication server 206 establishes an active session between client device 202*a* and the relying party entity responsive to promoting the local operating system login to the relying party entity.

Figure 5:
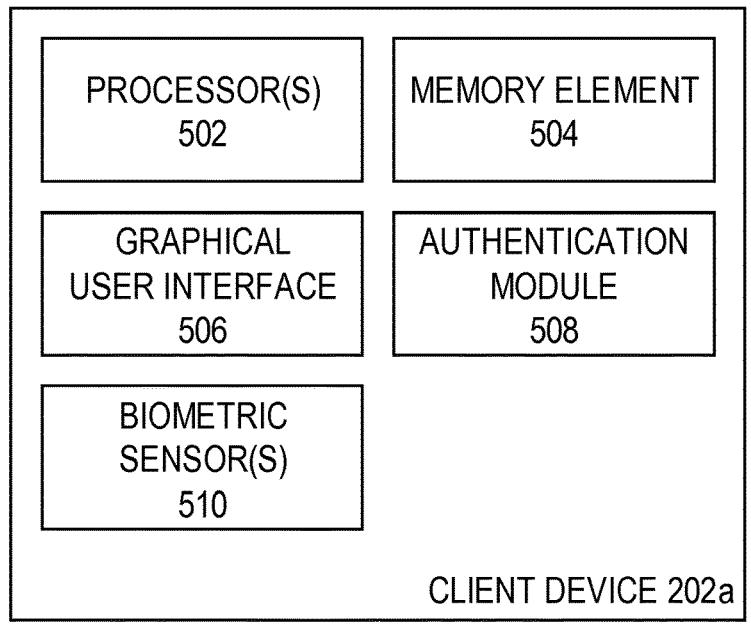
FIG. 5 is a simplified block diagram of an embodiment of the client device of FIG. 2.

Referring now to FIG. 5, FIG. 5 is a simplified block diagram of an embodiment of client device 202*a* of FIG. 2. Client device 202*a* includes processor(s) 502, a memory element 504, a graphical user interface 506, an authentication module 508, and one or more biometric sensor(s). Processor(s) 502 is configured to execute software instructions to perform various operations of client device 202*a* as described herein. Memory element 504 may be configured to store software instructions and data associated with client device 202*a*. Processor(s) 502 may be any type of processor, such as a micro-processor, an embedded processor, a digital signal processor (DSP), a network processor, or other device to execute code. Although only one processor(s) 502 is illustrated in FIG. 5, it should be understood that client device 202a may include more than one processor in some embodiments.

Graphical user interface 506 is configured to provide a graphical user interface to a user of client device 202a to facilitate the local OS login procedures as described herein. Authentication module 508 is configured to perform authentication functions associated with client device 202a as described herein. Biometric sensor(s) 510 is configured to collect biometric authentication factors from the user as described herein. In particular embodiments, biometric sensor(s) 510 may include one or more of a camera, a fingerprint sensor, or a microphone.

Figure 6:
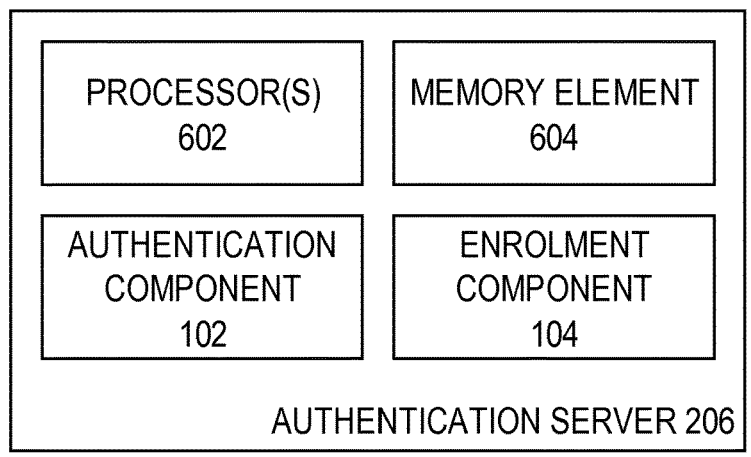
FIG. 6 is a simplified block diagram of an embodiment of authentication server of FIG. 2.

Referring now to FIG. 6, FIG. 6 is a simplified block diagram of an embodiment of authentication server 206 of FIG. 2. Authentication server 206 includes processor(s) 602, a memory element 604, authentication component 102 and enrolment component 104. Processor(s) 602 is configured to execute software instructions to perform various operations of authentication server 206 as described herein. Memory element 604 may be configured to store software instructions and data associated with authentication server 206. Processor(s) 602 may be any type of processor, such as a micro-processor, an embedded processor, a digital signal processor (DSP), a network processor, or other device to execute code. Although only one processor(s) 602 is illustrated in FIG. 6, it should be understood that authentication server 206 may include more than one processor in some embodiments.

Authentication component 102 is configured to facilitate the authentication and local OS login promotion functions of authentication server 206 as described herein, and enrolment component 104 is configured to facilitate the enrolment, administration, and policy management functions of authentication server 206 as described herein.

One or more embodiments may provide one or more of the following advantageous effects: provide for the use of multiple active authentication factors (e.g., biometrics), enhanced with multiple passive factors (e.g., a trusted device ID), processed and securely maintained locally, promoted remotely to transparently allow access to distinct resources, without the need to repeat the authentication process for each of the variety of remote applications; multiply the authentication factors as opposed to the use of a single mechanism; combine factors of different nature (active/passive) to guard against spoofing attempts; does not upload the actual credentials to the cloud or the cloud services that require them, nor does it attempt to automate the direct login to the cloud services and required transmission of needed credentials; gives the user and the service provider both the opportunity to set and strengthen the security bar to be met before access is allowed to the service; maintains the root of trust with the user and within a local level, which could be maintained in a secure environment; and based on the established trust generates a user profile that is used to transparently authenticate the user to multiple remote services.

Existing single sign on solutions usually do not involve biometrics, and are often a single factor authentication mechanism. In single sign on solutions the root of trust is maintained between multiple web sites. In accordance with various embodiments described herein, the root of trust is associated with the user and is maintained in a local secure setting, and never distributed among many entities.

Other embodiments are directed to combining biometric authentication with a dynamic device identifier in order to strengthen authentication to one or more relying party entities such as cloud-based entities. There are multiple existing mechanisms that websites employ to authenticate their users prior to granting them access. Some of these mechanisms include a username/password, second factors like one time password (OTP), and perhaps even biometrics. However each of these factors are independent from one another today, which allow malicious entities to independently obtain these factors through a variety of known mechanisms, and attempt to spoof their authentication.

Various embodiments described herein provide for a mechanism of combining biometrics, device identification, and device-based attestation to uniquely confirm that the authentication and context factors that are sent to the relying party entity are related to each other, as well as being generated from a device that has been associated with a user's account. In one or more particular embodiments, a one time password (OTP) is used as a device identifier, which allows for a short-lived, constantly changing identifier that cannot be tracked or reused. Accordingly, malicious entities would be required to obtain multiple types of factors to spoof on the authentication including "what you have", "what you know", and "what you are" types of factors. In accordance with one or more embodiments, the real user, however, is not burdened by having to prove all of these items. In accordance with one or more embodiments, a system is provided which facilitates implicitly providing some of these items, thereby achieving a balance between good usability and high-security.

In accordance with one or more embodiments, an alternative to traditional username/password-based authentication mechanisms to relying party entities such as a website or other cloud-hosted relying party entities. In an example process according to at least one embodiment, a user first enrolls an associated client device with a relying party entity. In particular embodiments, the process to enrol the client device may be strengthened routing the device identifier generation in a secure element within the client device. The user then enrolls a biometric authentication factor, such as a face, with the relying party entity. In particular embodiments, the relying party may also choose to set up an additional authentication factor such as a password or simple PIN for the user.

During authentication, the user provides the associated biometric authentication factor, and the system transparently provides proof that the identity of particular client device is the same as the identity of the client device that the user enrolled with the relying party entity. The relying party entity may also require that the user enter the additional authentication factor (e.g., a PIN), as well as require the system to uniquely sign the biometric data prior to the biometric data being sent for authentication. All of these authentication factors are tied to each other and are verified together by the relying party entity in order to grant access to resources of the relying party entity by the client device.

Figure 7:
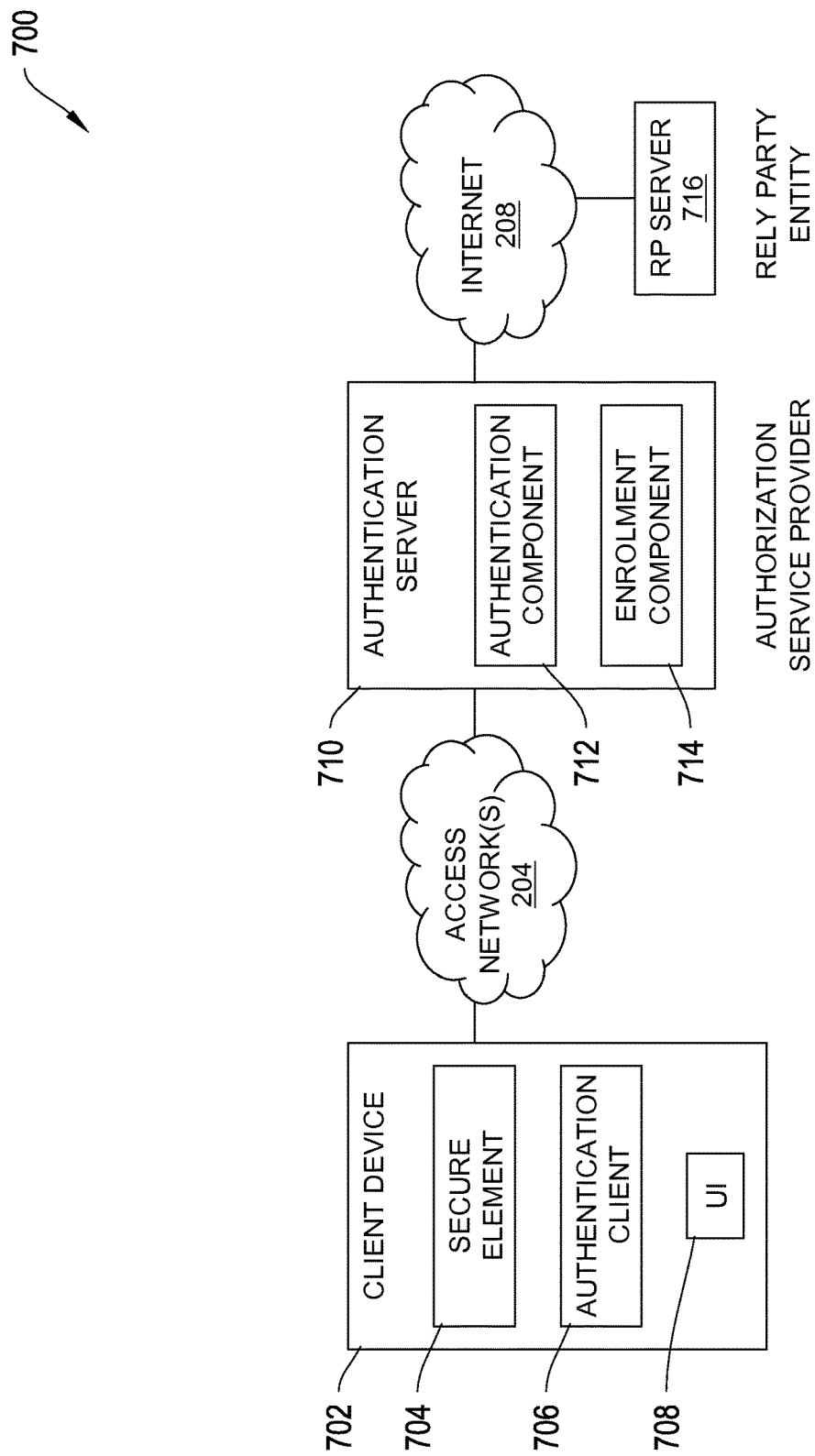
FIG. 7 illustrates a communication system for authenticating to a relying party entity using biometric and dynamic device identifier authentication in accordance with one embodiment.

FIG. 7 illustrates a communication system 700 for authenticating to a relying party entity using biometric and dynamic device identifier authentication in accordance with one embodiment. The communication system 700 include a client device 702 in communication with an authentication server 710 via one or more access network(s) 204. Authentication server 710 is in further communication with a relying party (RP) server 716 via the Internet 208. In particular embodiments, authentication server 710 is associated with an authorization service provider. Client device 702 includes a secure element 704, an authentication client 706, and a user interface (UI) 708. Secure element 704 is configured to securely generate and store a dynamic device identifier associated with client device 702. User interface (UI) 708 is configured to facilitate enrolment and authentication of a user associated with client device 702 with relying party (RP) server 716 as will be further described herein. Authentication client 706 is configured to facilitate communicating enrolment and authentication information to authentication server 710.

Access network(s) 204 may include one or more of a mobile access network, the Internet, or any other suitable access network to allow client devices 202a-202b to communicate with authentication server 206. Authentication server 710 includes an authentication component 712 configured to provide the authentication functions described herein and an enrolment component 714 configured to provide the enrolment functions described herein. In particular embodiments, authentication server 710 may be located within a core network of a service provider.

Client device 702 may include any electronic or computing device capable of accessing services or applications provided by relying party server 716. These client devices can include, for example mobile phones, desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these. The computing device may use operating systems that include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

Relying party (RP) server 716 is servers associated with a relying party entity providing resources such as a web site, vendor and other providers of data, services, and applications that require a user of client device 702 to be identified and authenticated before accessing their resources.

In an example implementation, client device 702, authentication server 710, and RP server 716 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 700, each of client device 702, authentication server 710, and RP server 716 can include memory elements for storing information to be used in the operations outlined herein. Each of client device 702, authentication server 710, and RP server 716 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 700 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 200, such as client device 702, authentication server 710, and RP server 716, may include software modules to achieve, or to foster, operations as outlined herein. These modules may be suitably combined in any appropriate manner, which may be based on particular configuration and/or provisioning needs. In certain embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of client device 702, authentication server 710, and RP server 716 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 8:
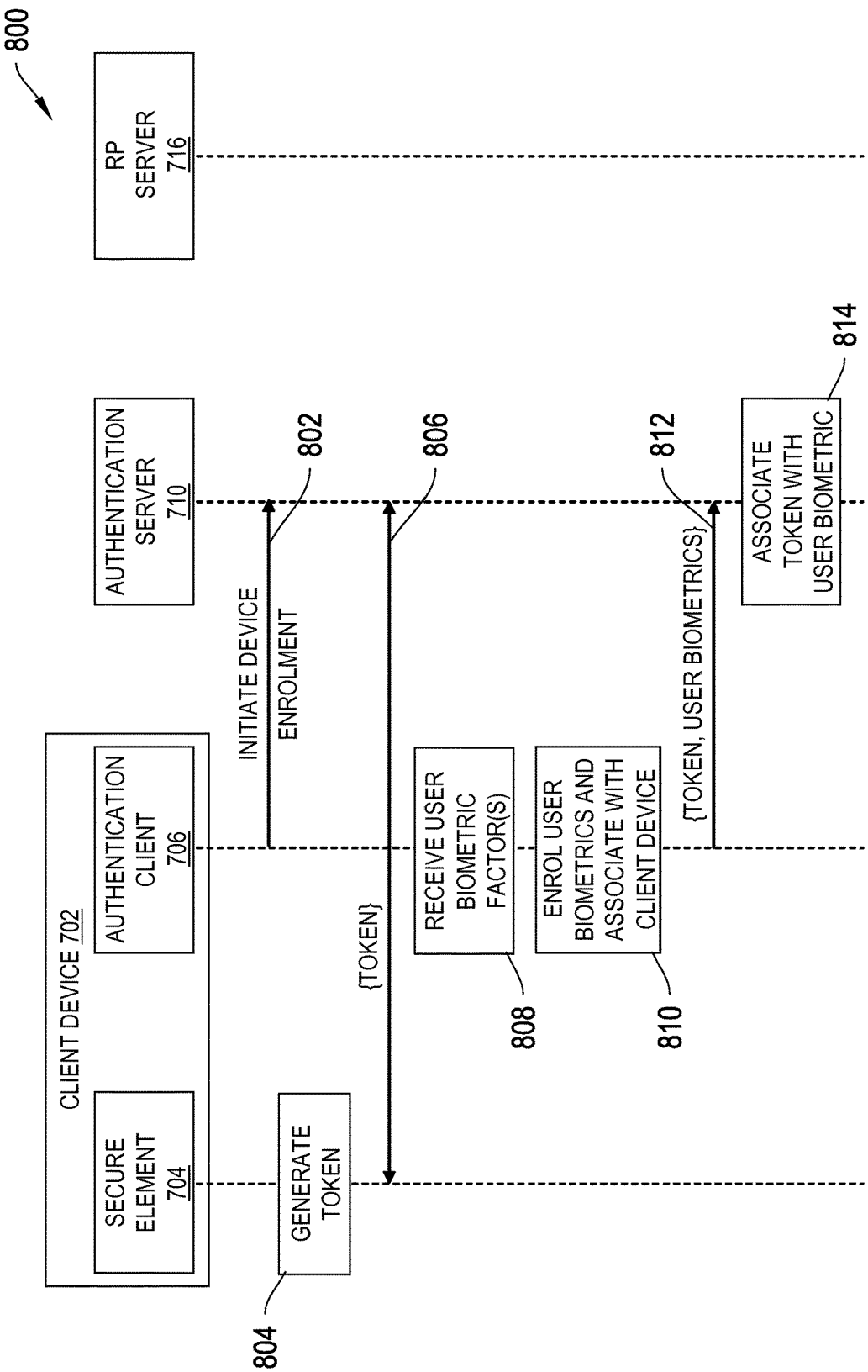
FIG. 8 illustrates an example of a process flow for enrolment of a client device with an authentication server in accordance with one embodiment.

FIG. 8 illustrates an example of a process flow 800 for enrolment of a client device 702 with an authentication server 710 in accordance with one embodiment. Enrolment of the client device 702 allows for the source of subsequent authentication attempts to be verified. The device enrolment is significantly strengthened if the enrolment and subsequent generation of the device identifier is performed within secure element 704 of client device 702. The enrolment further includes enrolment of a biometric authentication factor from the user as a portion of user authentication.

In 802, authentication client 706 initiates device enrolment with authentication server 710. In 804, client device 702 generates a token within secure element 704. In a particular embodiment, the token is generated based upon a public-key cryptography algorithm. In 806, client device 702 sends the token from secure element 704 to authentication server 710 as part of device enrolment. In 808, authentication client 706 of client device 702 receives one or more first biometric authentication factors from the user associated with client device 702. In 810, authentication client 706 of client device 702 enrolls the first biometric authentication factor(s) and associates the first biometric authentication factor(s) with client device 702. In 812, authentication client 706 of client device 702 sends the token and associated first biometric authentication factor(s) to authentication server 710. In 814, authentication server 710 associates the token with the user biometric(s). Accordingly, client device 702 is enrolled with authentication server 710 to allow for subsequent authentication of client device 702 with authentication server 710.

Figure 9:
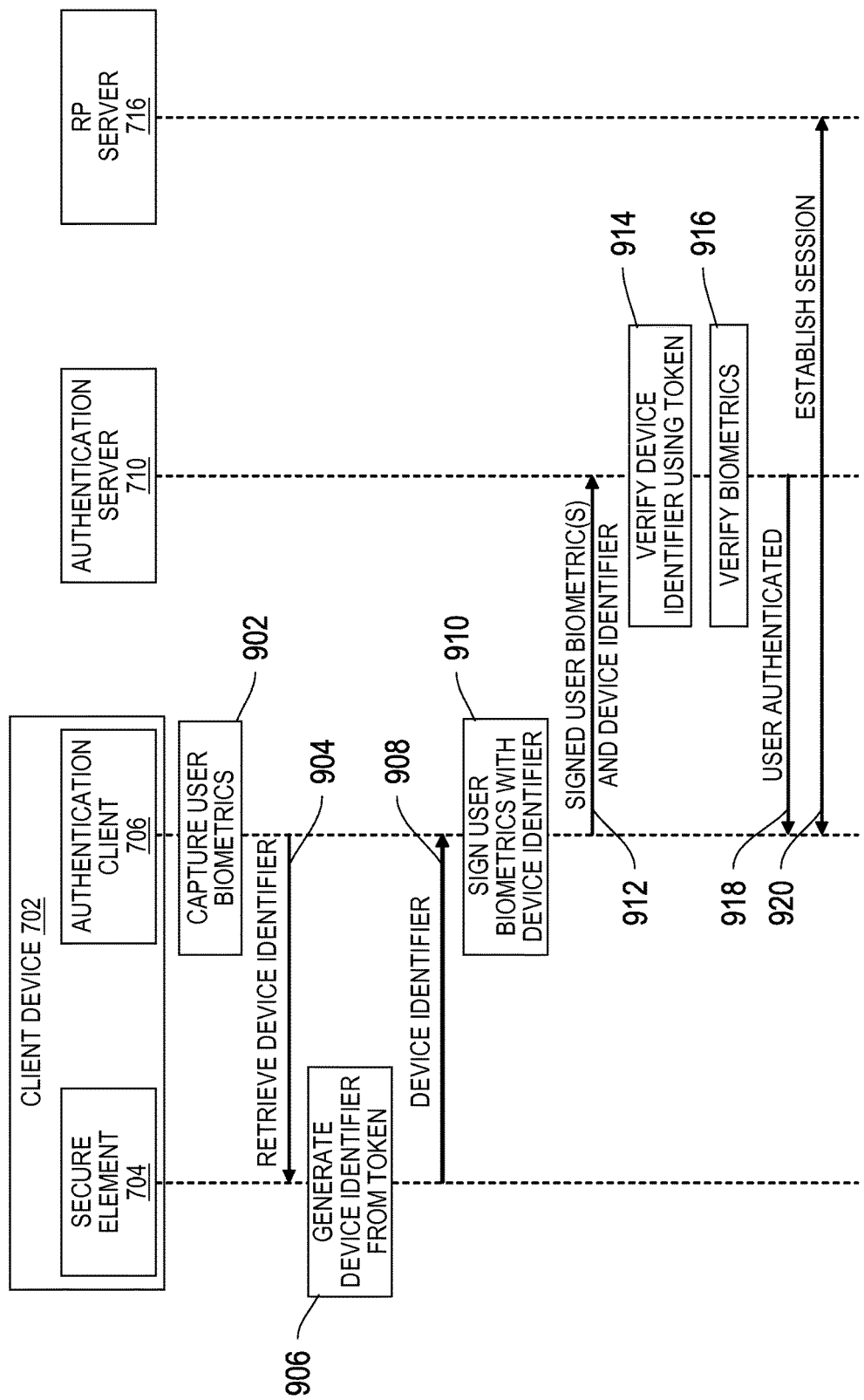
FIG. 9 illustrates an example of a process flow for authentication of a client device with an authentication server in accordance with one embodiment.

FIG. 9 illustrates an example of a process flow 900 for authentication of a client device 702 with an authentication server 710 in accordance with one embodiment. In 902, authentication client 706 of client device 702 captures second biometric authentication factors from the user associated with client device 702. In 904, authentication client 706 sends a request to retrieve a device identifier from secure element 704. In 906, client device 702 generates a device identifier from the token within secure element 704. In 908, client device 702 sends the generated device identifier to authentication client 706. In 910, authentication client 706 digitally signs the second biometric authentication factor(s) with the device identifier. In particular embodiments, the second biometric authentication factor(s) are signed using a key derived from the device identifier. In still another embodiment, the user biometrics are signed using another key established during the device enrolment process.

In 912, authentication client 706 sends the signed second biometric authentication factor(s) and device identifier to authentication server 710. In 914, authentication server 710 verifies the device identifier using the previously received token. In 916, authentication server 710 verifies the signed first biometric authentication factor(s) based upon the device identifier. In particular embodiments, authentication server 710 verifies the second biometric authentication factor(s) if the second biometric authentication factor(s) match the first biometric authentication factor(s). In particular embodiments, the signed user biometrics are verified using a key derived from the device identifier. In 918, upon verification authentication server 710 sends an indication that the user associated with client device 702 has been authenticated to authentication client 706 of client device 702 in order to grant access to RP server 716. In 920, a session is established between client device 702 and RP server 716 to allow client device 702 to access one or more resources provided by the relying party entity associated with RP server 716.

In one or more embodiments, the combination of user biometrics and a device identifier provides for confidence that the authorization request is coming from a registered device, and biding between the authorization request and the registered device. Using this combination, authorization server 710 may obtain a high confidence that an authorization request is genuine. In accordance with one or more embodiments, the generated device identifier serves as a one time password. Any form of identification (user or device) may bring with it a host of privacy issues, especially if there are static identifiers that can be tracked across usage. Using a generated device identifier as a one time password may have one or more of the following properties: 1) one generated, it is only valid for a short duration; (2) once verified by the authentication server, it becomes useless.

Since in accordance with various embodiments the device identifier is essentially a one time password, this allows for the device identifier to be unique for every authentication session. If the device identifier is stolen, it will be useless since it cannot be reused for subsequent authentication sessions. Furthermore, once generated, the device identifier must be used within a very short duration. If not, it once again becomes useless.

Figure 10A:
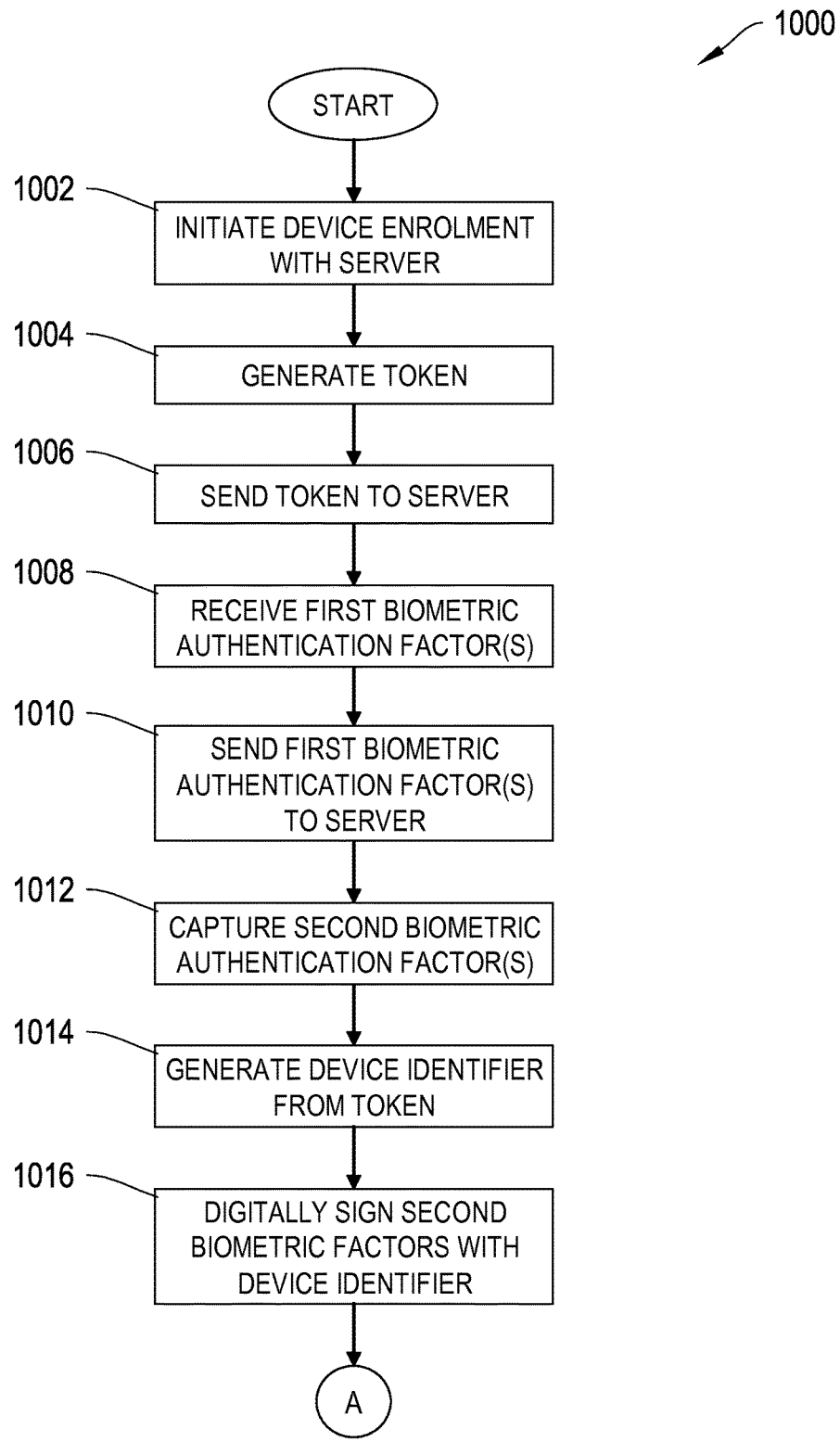
FIGS. 10A-10B are a simplified flow diagram illustrating example operations associated with enrolment and authentication of a client device in accordance with one embodiment.
Figure 10B:
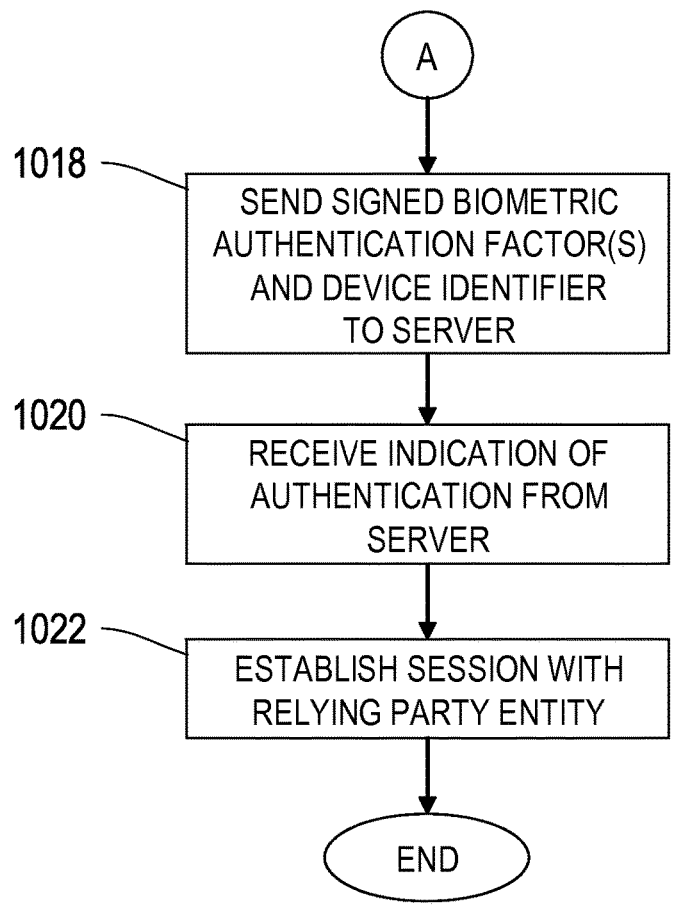

FIGS. 10A-10B are a simplified flow diagram 1000 illustrating example operations associated with enrolment and authentication of a client device in accordance with one embodiment. In 1002, a client device associated with a user, such as client device 702, initiates device enrolment with a server such as authentication server 710. In 1004, the client device generates a token within a secure element, such as secure element 704, of the client device associated with a user. In 1006, the client device sends the token to the server. In 1008, the client device receives one or more first biometric authentication factors associated with the user. In 1010, the client device sends the one or more first biometric authentication factors to the server, wherein the server is configured to associate the token with the one or more biometric authentication factors.

In 1012, the client device captures one or more second biometric authentication factors from the user. In 1014, the client device generates a device identifier associated with the client device from the token. In 1016, the client device digitally signs the one or more second biometric authentication factors with the device identifier. In a particular embodiment, the device identifier is generated within the secure element. In other particular embodiments, the one or more second biometric authentication factors are signed using a key derived from the device identifier.

In 1018, the client device sends the signed biometric authentication factors and the device identifier to the server. In one or more embodiments, the server is configured to verify the device identifier and the signed biometric authentication factors. In 1020, the client device receives an indication from the server that the user associated with the client device has been authenticated responsive to the server verifying the device identifier and the signed biometric authentication factors. In 1022, the client device establishes a session between the client device and a relying party entity to access one or more resources associated with the relying party entity. The operations then end.

Another embodiment is directed to a graphical user interface for policy management of network security resources within a network security platform (NSP) in which multiple objects are assigned to multiple resources. One or more embodiments provide for policy management by exposing all network interfaces of all intrusion prevention system sensors on a "single pane of glass" and then enabling a user to view, create, edit and assign policy on one or more interfaces at a time with minimal user interface interaction. In accordance with various embodiments, a "single pane of glass" refers to use of a single control panel for performing a number of policy management functions.

It is important to understand that a policy in the context of many network security products today is actually a collection of multiple policy types. For example, the "policy" assigned to a given network interface may include definitions/groupings for each of the following policy types: (1) intrusion prevention; (2) advanced malware analysis; (3) traffic inspection; (4) firewall/access control; (5) rate limiting/tagging rules; and (6) connection limiting/denial of service (DoS) prevention. This inherent complexity presents difficulty in the management of traditional systems because something as seemingly simple as assigning policy to a single interface actually includes the assignment of six sets of definitions. In a common use case in which an administrator has ten devices each having ten interfaces, six hundred assignments need to be managed. Moreover, because of the level of complexity per interface, network security platforms have traditionally exposed management per interface. That is, the administrator is forced to manage assignments for a single interface at a time. To manage those six hundred assignments, one hundred different UI pages may need to be navigated, and on each page, assignments will need to be updated and the changes saved. In accordance with one or more embodiments, exposing the interfaces on a "single pane of glass" allows the potential updating of policy assignments across, for example, one hundred interfaces in fewer than a dozen clicks and avoids the large potential for human error along the way.

Core use cases for centralized policy management in the network security context includes:
1. Compare and contrast current policy type assignments across multiple interfaces.
2. Filter in or out interfaces based on existing assignments and/or interface metadata.
3. Update the assignments for one or multiple interfaces.
4. View the details for a given policy definition.
5. Edit the details for a given policy definition.
6. Create a new policy definition.

Figure 11:
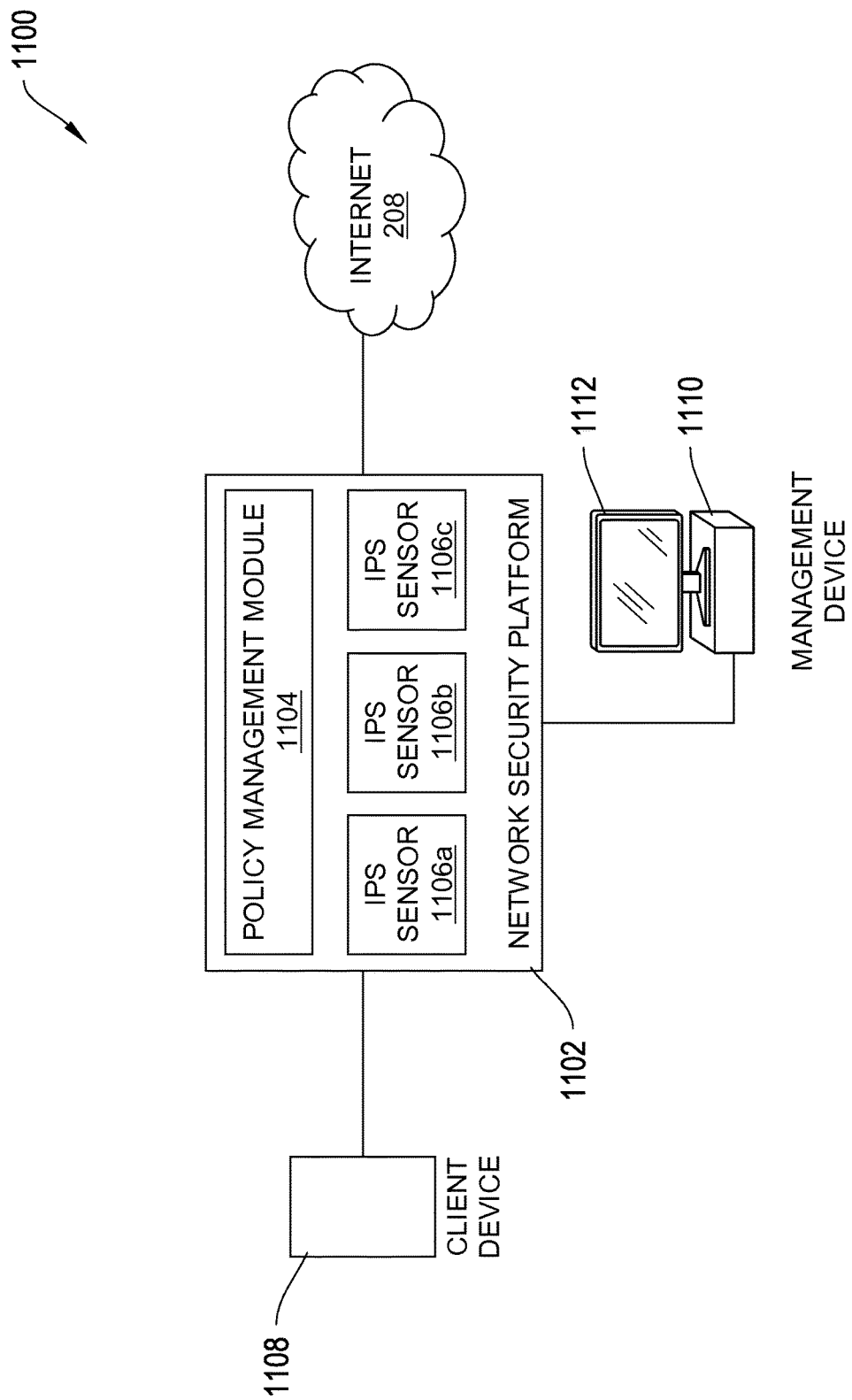
FIG. 11 illustrates a communication system for policy management of network security resources within a network security platform (NSP) in accordance with one embodiment.

FIG. 11 illustrates a communication system 1100 for policy management of network security resources within a network security platform (NSP) in accordance with one embodiment. The communication system 1100 includes a network security platform 1102 including a policy management module 1104, a first intrusion prevention sensor (IPS) 1106a, a second IPS 1106b, and a third IPS 1106c. Communication system 1100 further includes a client module 1108 and a management device 1110, each in communication with network security platform 1102. Network security platform 1102 is in further communication with the Internet 208. Network security platform 1102 is in further communication with the Internet 208. In one or more embodiments each of first IPS 1106a, second IPS 1106b, and third IPS 1106c are network elements, hardware devices and/or software modules configured to detect and prevent intrusions and other attacks upon network traffic and/or network elements, such as client device 1108 within communication network 1100.

Policy management module 1104 is configured to manage one or more policies configured on each of first IPSs 1106a, second IPS 1106b, and third IPS 1106c. A policy is a user-configured security rule that determines how detection of intrusions are performed and how traffic between client device 1108 and Internet 208 is treated by each of first IPSs 1106a, second IPS 1106b, and third IPS 1106c within communication network 1100. Examples of functions that may be performed by one or more of first IPSs 1106a, second IPS 1106b, and third IPS 1106c include, but are not limited to, stateful traffic inspection, signature detection, anomaly detection, denial of service (DoS) detection, intrusion prevention, and encrypted attack protection.

Management device 1110 includes a display 1112 connected thereto and configured to provide a policy management graphical user interface (GUI) to an administrator or other user of management device 1110. The policy management GUI is configured to allow an administrator to interface with policy management module 1104 of network security platform 1102 to enable configuration of first IPSs 1106a, second IPS 1106b, and third IPS 1106c as will be further described herein. Client device 1108 and/or management device 1110 may include any electronic or computing device capable of communication with network security platform 1102, and can include, for example mobile phones, desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these. The computing device may use operating systems that include, but are not limited to, Android, Berkeley Software Distribution (BSD), iPhone OS (iOS), Linux, OS X, Unix-like Real-time Operating System (e.g., QNX), Microsoft Windows, Window Phone, and IBM z/OS.

FIG. 12 illustrates a protection profile interface management page 1200 within a traditional network security platform GUI. A Protection Profile page 1200 in a network security platform GUI is shown which allows user management of assignments for a single interface. Some of the shortcomings of the Protection Profile page include:
1. There is no way to compare/contrast assignments across multiple interfaces because only a single interface's assignments are exposed at a time.
2. There is no way to change assignments to more than a single interface at a time.
3. Network security platforms have traditionally separated policy definition from policy assignment, so there is no consistent option to view, edit or create policy definitions.

Various embodiments described herein may address one or more of these shortcomings.

FIG. 13 illustrates a policy management GUI page 1300 for a network security platform in accordance with one embodiment. In one or more embodiments, the page 1300 of FIG. 13 may be used to perform core policy management tasks such as adding, editing and assigning policies. The policy management GUI page 1300 includes an Interfaces tab 1302 and Devices tab 1304 in which the Interfaces tab 1302 is shown as selected. The Interfaces tab 1302 includes a grid view including a device name field, interface name field, policy group field, and individual policy assignments fields. The individual policy assignments fields include an IPS field, an advance malware field, an inspection options field, a connection limiting field, a firewall field, and a quality of service (QoS) field. In the example of FIG. 13, one device with three interfaces is shown. As shown in FIG. 13, it can be seen that comparing and contrasting assignments is easily performed because all interfaces and their assignments are viewable on the grid.

FIG. 14 illustrates a policy management GUI page 1400 for a network security platform for performing filtering operations according to one embodiment. The policy management GUI page 1400 includes a "Quick Search" field 1402 to facilitate setting of current filters and a "Clear All Filters" field 1404 to clear the current filters. With the grid view, searching/filtering is straightforward. For example, a user can easily filter based on interface name or assigned policy.

FIG. 15 illustrates a policy management GUI page 1500 for a network security platform for performing bulk editing operations according to one embodiment. The bulk editing operations provide for the ability to edit policy assignments simultaneously across interfaces. When multiple interfaces are selected within the GUI, the page 1500 enters bulk edit mode which provides granularity down to the policy type by providing a "Multiple Interfaces Selected" panel 1502 in which a policy group for the selected interfaces may be assigned as well as the simultaneous setting of all of the individual policy assignments (e.g., IPS, advanced malware, inspection options, connection limiting, firewall, and quality of service (QoS) for each interface. For example, a user can choose to assign the same connection limiting policy to all selected interfaces without impacting the IPS policy currently assigned to each interface.

FIG. 16 illustrates a policy management GUI page 1600 for a network security platform for performing viewing, editing, and creating of policy definitions according to one embodiment. Upon selecting one or more interfaces 1602, a policy editing panel 1604 is configured to open in which one or more of the individual policy assignments may be manipulated including creating a new policy, viewing the existing policy, and editing of the existing policy. For example, a typical IPS policy contains thousands of attack definitions and a firewall policy can contain from dozens to thousands of rules. So, while it makes good sense to keep the management of a policy definition separated from its assignments, the GUI page 1600 enables easy transition between the two workflows. Specifically, viewing/editing the details of a selected policy is accessible with a click, as is the ability to create a new policy when needed.

Accordingly, one or more embodiments allow the use of a "single pane of glass" or single control panel to centralize and simplify the management of objects, such as policies, and their assignments to resources, such as network interfaces.

EXAMPLES

The following examples pertain to further embodiments.

Example 1 is a system for authentication comprising at least one processor and at least one memory element, wherein the system is configured for: receiving an indication of a local operating system login by a user from a client device associated with the user; receiving one or more authentication factors associated with the user from the client device; and determining whether the local operating system login is to be promoted to a relying party entity based upon the one or more authentication factors associated with the user.

In Example 2, the subject matter of Example 1 can optionally include wherein determining whether the local operating system login is to be promoted to the relying party entity includes determining whether the one or more authentication factors meet a required level of security.

In Example 3, the subject matter of Example 2 can optionally include wherein the system is further configured for promoting the local operating system login to the relying party entity responsive to determining that the authentication factors meet the required level of security.

In Example 4, the subject matter of Examples 1-3 can optionally include wherein promoting the local operating system login to the relying party entity includes authorizing the client device to access one or more resources associated with the relying party entity.

In Example 5, the subject matter of Example 4 can optionally include wherein the one or more resources include at least one of a service provided by the relying party entity or an application provided by the relying party entity.

In Example 6, the subject matter of Examples 1-5 can optionally include wherein the system is further configured for establishing an active session between the client device and the relying party entity responsive to promoting the local operating system login to the relying party entity.

In Example 7, the subject matter of Examples 1-6 can optionally include wherein the one or more authentication factors include one or more of at least one active authentication factor and at least one passive authentication factor.

In Example 8, the subject matter of Example 7 can optionally include wherein the at least one active authentication factor include a biometric authentication factor.

In Example 9, the subject matter of Example 8 can optionally include wherein the biometric authentication factor includes facial recognition of the user.

In Example 10, the subject matter of Example 7 can optionally include wherein the at least one active authentication factor includes a liveliness indication of the user.

In Example 11, the subject matter of Example 7 can optionally include wherein the at least one passive authentication factor includes a device identifier associated with the client device.

Example 12 is at least one non-transitory computer storage medium to store computer code comprising: computer code to receive an indication of a local operating system login by a user from a client device associated with the user; computer code to receive one or more authentication factors associated with the user from the client device; and computer code to determine whether the local operating system login is to be promoted to a relying party entity based upon the one or more authentication factors associated with the user.

In Example 13, the subject matter of Example 12 can optionally include wherein determining whether the local operating system login is to be promoted to the relying party entity includes determining whether the one or more authentication factors meet a required level of security.

In Example 14, the subject matter of Example 13 can optionally include wherein the system is further configured for promoting the local operating system login to the relying party entity responsive to determining that the authentication factors meet the required level of security.

In Example 15, the subject matter of Examples 12-14 can optionally include wherein promoting the local operating system login to the relying party entity includes authorizing the client device to access one or more resources associated with the relying party entity.

In Example 16, the subject matter of Example 15 can optionally include wherein the one or more resources include at least one of a service provided by the relying party entity or an application provided by the relying party entity.

In Example 17, the subject matter of Examples 12-16 can optionally include wherein the system is further configured for establishing an active session between the client device and the relying party entity responsive to promoting the local operating system login to the relying party entity.

In Example 18, the subject matter of Examples 12-17 can optionally include wherein the one or more authentication factors include one or more of at least one active authentication factor and at least one passive authentication factor.

In Example 19, the subject matter of Example 18 can optionally include wherein the at least one active authentication factor include a biometric authentication factor.

In Example 20, the subject matter of Example 19 an optionally include wherein the biometric authentication factor includes facial recognition of the user.

In Example 21, the subject matter of Example 18 can optionally include wherein the at least one active authentication factor includes a liveliness indication of the user.

In Example 22, the subject matter of Example 18 can optionally include wherein the at least one passive authentication factor includes a device identifier associated with the client device.

Example 23 is a computer-implemented method for authentication comprising: receiving an indication of a local operating system login by a user from a client device associated with the user; receiving one or more authentication factors associated with the user from the client device; and determining whether the local operating system login is to be promoted to a relying party entity based upon the one or more authentication factors associated with the user.

In Example 24, the subject matter of Example 23 can optionally include wherein determining whether the local operating system login is to be promoted to the relying party entity includes determining whether the one or more authentication factors meet a required level of security.

In Example 25, the subject matter of Example 24 can optionally include promoting the local operating system login to the relying party entity responsive to determining that the authentication factors meet the required level of security.

In Example 26, the subject matter of Examples 23-25 can optionally include wherein promoting the local operating system login to the relying party entity includes authorizing the client device to access one or more resources associated with the relying party entity.

In Example 27, the subject matter of Examples 23-26 can optionally include wherein the one or more authentication factors include one or more of at least one active authentication factor and at least one passive authentication factor.

Example 28 is an apparatus for authentication comprising: means for receiving an indication of a local operating system login by a user from a client device associated with the user; means for receiving one or more authentication factors associated with the user from the client device; and means for determining whether the local operating system login is to be promoted to a relying party entity based upon the one or more authentication factors associated with the user.

In Example 29, the subject matter of Example 28 can optionally include wherein determining whether the local operating system login is to be promoted to the relying party entity includes determining whether the one or more authentication factors meet a required level of security.

In Example 30, the subject matter of Example 29 can optionally include means for promoting the local operating system login to the relying party entity responsive to determining that the authentication factors meet the required level of security.

In Example 31, the subject matter of Examples 28-30 can optionally include wherein promoting the local operating system login to the relying party entity includes authorizing the client device to access one or more resources associated with the relying party entity.

In Example 32, the subject matter of Examples 28-31 can optionally include wherein the system is further configured for establishing an active session between the client device and the relying party entity responsive to promoting the local operating system login to the relying party entity.

Example 33 is a system comprising at least one processor and at least one memory element, wherein the system is configured for: generating a token within a secure element of a client device associated with a user; sending the token to a server; receiving one or more first biometric authentication factors associated with the user; and sending the one or more first biometric authentication factors to the server, wherein the server is configured to associate the token with the one or more biometric authentication factors.

In Example 34, the subject matter of Example 33 can optionally include wherein the system is further configured for: capturing one or more second biometric authentication factors from the user; generating a device identifier associated with the client device from the token; and digitally signing the one or more second biometric authentication factors with the device identifier.

In Example 35, the subject matter of Example 34 can optionally include wherein the device identifier is generated within the secure element.

In Example 36, the subject matter of Examples 33-35 can optionally include wherein the one or more second biometric authentication factors are signed using a key derived from the device identifier.

In Example 37, the subject matter of Example 36 can optionally include wherein the system is further configured for sending the signed biometric authentication factors and the device identifier to the server.

In Example 38, the subject matter of Example 37 can optionally include wherein the server is configured to verify the device identifier and the signed biometric authentication factors.

In Example 39, the subject matter of Example 38 can optionally include wherein the system is further configured for receiving an indication from the server that the user associated with the client device has been authenticated responsive to the server verifying the device identifier and the signed biometric authentication factors.

In Example 40, the subject matter of Example 39 can optionally include wherein the system is further configured to establish a session between the client device and a relying party entity to access one or more resources associated with the relying party entity.

Example 41 is at least one non-transitory computer storage medium to store computer code comprising: computer code to generate a token within a secure element of a client device associated with a user; computer code to send the token to a server; computer code to receive one or more first biometric authentication factors associated with the user; and computer code to send the one or more first biometric authentication factors to the server, wherein the server is configured to associate the token with the one or more biometric authentication factors.

Example 42 is at least one non-transitory computer storage medium of Example 41, further comprising: computer code to capture one or more second biometric authentication factors from the user; computer code to generate a device identifier associated with the client device from the token; and computer code to digitally sign the one or more second biometric authentication factors with the device identifier.

In Example 43, the subject matter of Example 42 can optionally include wherein the one or more second biometric authentication factors are signed using a key derived from the device identifier.

In Example 44, the subject matter of Example 43 can optionally include computer code to send the signed biometric authentication factors and the device identifier to the server.

In Example 45, the subject matter of Example 44 can optionally include wherein the server is configured to verify the device identifier and the signed biometric authentication factors.

In Example 46, the subject matter of Example 45 can optionally include computer code to receive an indication from the server that the user associated with the client device has been authenticated responsive to the server verifying the device identifier and the signed biometric authentication factors.

In Example 47, the subject matter of Example 46 can optionally include computer code to establish a session between the client device and a relying party entity to access one or more resources associated with the relying party entity.

Example 48 is a computer-implemented method for authentication comprising: generating a token within a secure element of a client device associated with a user; sending the token to a server; receiving one or more first biometric authentication factors associated with the user; and sending the one or more first biometric authentication factors to the server, wherein the server is configured to associate the token with the one or more biometric authentication factors.

In Example 49, the subject matter of Example 48 can optionally include capturing one or more second biometric authentication factors from the user; generating a device identifier associated with the client device from the token; and digitally signing the one or more second biometric authentication factors with the device identifier.

In Example 50, the subject matter of Example 49 can optionally include sending the signed biometric authentication factors and the device identifier to the server, wherein the server is configured to verify the device identifier and the signed biometric authentication factors In Example 51, the subject matter of Example 50 can optionally include receiving an indication from the server that the user associated with the client device has been authenticated responsive to the server verifying the device identifier and the signed biometric authentication factors.

In Example 52, the subject matter of Example 51 can optionally include establishing a session between the client device and a relying party entity to access one or more resources associated with the relying party entity.

Example 53 is an apparatus for authentication, comprising: means for generating a token within a secure element of a client device associated with a user; means for sending the token to a server; means for receiving one or more first biometric authentication factors associated with the user; and means for sending the one or more first biometric authentication factors to the server, wherein the server is configured to associate the token with the one or more biometric authentication factors.

In Example 54, the subject matter of Example 53 can optionally include means for capturing one or more second biometric authentication factors from the user; means for generating a device identifier associated with the client device from the token; and means for digitally signing the one or more second biometric authentication factors with the device identifier.

In Example 55, the subject matter of Example 54 can optionally include means for sending the signed biometric authentication factors and the device identifier to the server, wherein the server is configured to verify the device identifier and the signed biometric authentication factors In Example 56, the subject matter of Example 55 can optionally include means for receiving an indication from the server that the user associated with the client device has been authenticated responsive to the server verifying the device identifier and the signed biometric authentication factors.

In Example 57, the subject matter of Example 56 can optionally include means for establishing a session between the client device and a relying party entity to access one or more resources associated with the relying party entity.

Example 58 is an apparatus comprising means to perform a method as claimed in any preceding claims.

Example 59 is machine-readable storage including machine-readable instructions, when executed, to implement a method or realize an apparatus as claimed in any preceding claim.

The invention claimed is:

1. A system for authentication comprising at least one processor and at least one memory element, wherein the system is configured for:
   receiving an indication of a local operating system login by a user from a client device associated with the user;
   receiving one or more authentication factors associated with the user from the client device; and
   determining whether the local operating system login is to be promoted to a plurality of relying party entities based upon the one or more authentication factors associated with the user;
   wherein, each of the plurality of relying party entities comprise at least one server, configured to provide at least one of data and services to the client device.

2. The system of claim 1, wherein determining whether the local operating system login is to be promoted to the plurality of relying party entities includes determining whether the one or more authentication factors meet a required level of security.

3. The system of claim 2, wherein the system is further configured for promoting the local operating system login to the plurality of relying party entities responsive to determining that the authentication factors meet the required level of security.

4. The system of claim 3, wherein promoting the local operating system login to each of the plurality of relying party entities includes authorizing the client device to access one or more resources associated with each of the plurality of relying party entities.

5. The system of claim 4, wherein the one or more resources include at least one of a service provided by each of the plurality of relying party entities or an application provided by each of the plurality of relying party entities.

6. The system of claim 3, wherein the system is further configured for establishing an active session between the client device and each of the plurality of relying party entities responsive to promoting the local operating system login to each of the plurality of relying party entities.

7. The system of claim 1, wherein the one or more authentication factors include one or more of at least one active authentication factor and at least one passive authentication factor.

8. The system of claim 7, wherein the at least one active authentication factor includes a biometric authentication factor.

9. The system of claim 8, wherein the biometric authentication factor includes facial recognition of the user.

10. The system of claim 7, wherein the at least one active authentication factor includes a liveliness indication of the user.

11. The system of claim 7, wherein the at least one passive authentication factor includes a device identifier associated with the client device.

12. At least one non-transitory computer storage medium to store computer code comprising:
   computer code to receive an indication of a local operating system login by a user from a client device associated with the user;
   computer code to receive one or more authentication factors associated with the user from the client device; and
   computer code to determine whether the local operating system login is to be promoted to a plurality of relying party entities based upon the one or more authentication factors associated with the user;
   wherein, each of the plurality of relying party entities comprise at least one server, configured to provide at least one of data and services to the client device.

13. The at least one non-transitory computer storage medium of claim 12, wherein determining whether the local operating system login is to be promoted to each of the plurality of relying party entities includes determining whether the one or more authentication factors meet a required level of security.

14. The at least one non-transitory computer storage medium of claim 13, wherein the system is further configured for promoting the local operating system login to each of the plurality of relying party entities responsive to determining that the authentication factors meet the required level of security.

15. The at least one non-transitory computer storage medium of claim 14, wherein promoting the local operating system login to each of the plurality of relying party entities includes authorizing the client device to access one or more resources associated with each of the plurality of relying party entities.

16. The at least one non-transitory computer storage medium of claim 15, wherein the one or more resources include at least one of a service provided by each of the plurality of relying party entities or an application provided by each of the plurality of relying party entities.

17. The at least one non-transitory computer storage medium of claim 14, wherein the system is further configured for establishing an active session between the client device and each of the plurality of relying party entities responsive to promoting the local operating system login to each of the plurality of relying party entities.

18. The at least one non-transitory computer storage medium of claim 12, wherein the one or more authentication factors include one or more of at least one active authentication factor and at least one passive authentication factor.

19. The at least one non-transitory computer storage medium of claim 18, wherein the at least one active authentication factor includes a biometric authentication factor.

20. The at least one non-transitory computer storage medium of claim 19, wherein the biometric authentication factor includes facial recognition of the user.

21. The at least one non-transitory computer storage medium of claim 18, wherein the at least one active authentication factor includes a liveliness indication of the user.

22. The at least one non-transitory computer storage medium of claim 18, wherein the at least one passive authentication factor includes a device identifier associated with the client device.

23. A system comprising at least one processor and at least one memory element, wherein the system is configured for:
   generating a token within a secure element of a client device associated with a user;
   sending the token to a server;
   receiving one or more first biometric authentication factors associated with the user; and
   sending the one or more first biometric authentication factors to the server, wherein the server is configured to associate the token with the one or more biometric authentication factors;
   wherein, the server is configured to provide at least one of data and services to the client device from a plurality of relying parties based on the authentication of the token.

24. At least one non-transitory computer storage medium to store computer code comprising:
   computer code to generate a token within a secure element of a client device associated with a user;
   computer code to send the token to a server;
   computer code to receive one or more first biometric authentication factors associated with the user; and
   computer code to send the one or more first biometric authentication factors to the server, wherein the server is configured to associate the token with the one or more biometric authentication factors
   wherein, the server is configured to provide at least one of data and services to the client device from a plurality of relying parties based on the authentication of the token.

25. The at least one non-transitory computer storage medium of claim 24, further comprising:
   computer code to capture one or more second biometric authentication factors from the user;
   computer code to generate a device identifier associated with the client device from the token; and
   computer code to digitally sign the one or more second biometric authentication factors with the device identifier.

26. The at least one non-transitory computer storage medium of claim 25, wherein the one or more second biometric authentication factors are signed using a key derived from the device identifier.

27. The at least one non-transitory computer storage medium of claim 26, further comprising computer code to send the signed biometric authentication factors and the device identifier to the server.

28. The at least one non-transitory computer storage medium of claim 27, wherein the server is configured to verify the device identifier and the signed biometric authentication factors.

29. The at least one non-transitory computer storage medium of claim 28, further comprising computer code to receive an indication from the server that the user associated with the client device has been authenticated responsive to the server verifying the device identifier and the signed biometric authentication factors.

30. The at least one non-transitory computer storage medium of claim 29, further comprising computer code to establish a session between the client device and a relying party entity to access one or more resources associated with the relying party entity.

* * * * *

UNITED STATES PATENT AND TRADEMARK OFFICE
CERTIFICATE OF CORRECTION

Page 1 of 1

PATENT NO. : 10,237,254 B2
APPLICATION NO. : 14/780528
DATED : March 19, 2019
INVENTOR(S) : Neeraj Kaul et al.

It is certified that error appears in the above-identified patent and that said Letters Patent is hereby corrected as shown below:

In the Specification

In Column 1, Line 4, delete "PCT/US15/22531" and insert -- PCT/US15/22931 --, therefor.

Signed and Sealed this
Ninth Day of July, 2019

Andrei Iancu
*Director of the United States Patent and Trademark Office*